US012577360B2

(12) United States Patent
Aou et al.

(10) Patent No.: US 12,577,360 B2
(45) Date of Patent: Mar. 17, 2026

(54) VISCOELASTIC POLYURETHANE FOAM WITH COATING

(71) Applicants: Dow Global Technologies LLC, Midland, MI (US); Rohm and Haas Company, Collegeville, PA (US)

(72) Inventors: Kaoru Aou, Lake Jackson, TX (US); Yibei Gu, Redwood City, CA (US); Rajat Duggal, Manvel, TX (US); Yasmin N. Srivastava, Sugar Land, TX (US); Joseph Jacobs, Yardley, PA (US); Qinghao Meng, Angleton, TX (US); Gregoire Cardoen, Collegeville, PA (US); Ralph C. Even, Blue Bell, PA (US); Morgan A. Springs, Angleton, TX (US)

(73) Assignees: Dow Global Technologies LLC, Midland, MI (US); Rohm and Haas Company, Collegeville, PA (US)

( * ) Notice: Subject to any disclaimer, the term of this patent is extended or adjusted under 35 U.S.C. 154(b) by 0 days.

(21) Appl. No.: 18/482,049

(22) Filed: Oct. 6, 2023

(65) Prior Publication Data

US 2024/0043644 A1 Feb. 8, 2024

Related U.S. Application Data

(60) Continuation of application No. 17/149,922, filed on Jan. 15, 2021, which is a division of application No. 16/093,415, filed as application No. PCT/US2017/035469 on Jun. 1, 2017, now abandoned.

(60) Provisional application No. 62/344,432, filed on Jun. 2, 2016.

(51) Int. Cl.
| | |
|---|---|
| *C08G 18/48* | (2006.01) |
| *C08G 18/08* | (2006.01) |
| *C08G 18/16* | (2006.01) |
| *C08G 18/18* | (2006.01) |
| *C08G 18/20* | (2006.01) |
| *C08G 18/24* | (2006.01) |
| *C08G 18/76* | (2006.01) |
| *C08J 9/00* | (2006.01) |
| *C08J 9/36* | (2006.01) |
| *C08K 3/36* | (2006.01) |
| *C08K 9/06* | (2006.01) |
| *C08K 9/10* | (2006.01) |
| *C09D 133/02* | (2006.01) |
| *C08L 83/04* | (2006.01) |

(52) U.S. Cl.
CPC ........ *C08J 9/0009* (2013.01); *C08G 18/0866* (2013.01); *C08G 18/163* (2013.01); *C08G 18/1833* (2013.01); *C08G 18/2081* (2013.01); *C08G 18/244* (2013.01); *C08G 18/4816* (2013.01); *C08G 18/4829* (2013.01); *C08G 18/4837* (2013.01); *C08G 18/4841* (2013.01); *C08G 18/7664* (2013.01); *C08J 9/365* (2013.01); *C08K 9/10* (2013.01); *C09D 133/02* (2013.01); *C08G 18/18* (2013.01); *C08G 18/24* (2013.01); *C08G 2110/0008* (2021.01); *C08G 2110/005* (2021.01); *C08G 2110/0058* (2021.01); *C08G 2110/0083* (2021.01); *C08G 2350/00* (2013.01); *C08J 2375/04* (2013.01); *C08K 3/36* (2013.01); *C08K 9/06* (2013.01); *C08L 83/04* (2013.01)

(58) Field of Classification Search
CPC .................................................. C09K 5/00–20
See application file for complete search history.

(56) References Cited

U.S. PATENT DOCUMENTS

| | | | |
|---|---|---|---|
| 4,223,095 A | 9/1980 | Esser et al. | |
| 4,246,387 A | 1/1981 | Deutsch | |
| 4,279,953 A | 7/1981 | Barden et al. | |
| 4,302,337 A | 11/1981 | Larson et al. | |
| 4,596,665 A | 6/1986 | Gonzalez et al. | |
| 4,599,392 A | 7/1986 | McKinney et al. | |
| 4,863,976 A | 9/1989 | Nichols et al. | |
| 4,988,781 A | 1/1991 | McKinney et al. | |
| 5,216,584 A | 6/1993 | Okazaki et al. | |
| 5,362,832 A | 11/1994 | Cook | |
| 5,718,674 A | 2/1998 | Penrose | |
| 5,790,980 A * | 8/1998 | Yewer, Jr. ........ | A41D 19/01523 |
| | | | 2/167 |

(Continued)

FOREIGN PATENT DOCUMENTS

| | | |
|---|---|---|
| CA | 2020745 | 1/1992 |
| CA | 2068703 | 11/1993 |

(Continued)

OTHER PUBLICATIONS

Machine Translation of JP2003-011256A. Jan. 15, 2003. (Year: 2003).*

(Continued)

*Primary Examiner* — Stephen E Rieth
(74) *Attorney, Agent, or Firm* — Warner Norcross + Judd LLP

(57) ABSTRACT

A coated viscoelastic polyurethane foam includes a viscoelastic polyurethane foam having the coating thereon, the viscoelastic polyurethane foam having a resiliency of less than or equal to 20% as measured according to ASTM D3574, and a coating material on and embedded within the viscoelastic polyurethane foam, the coating material including an aqueous polymer emulsion and an encapsulated phase change material.

8 Claims, 1 Drawing Sheet

(56) References Cited

U.S. PATENT DOCUMENTS

| | | | | |
|---|---|---|---|---|
| 5,955,188 | A * | 9/1999 | Pushaw | D06M 23/12 |
| | | | | 428/323 |
| 8,318,257 | B2 | 11/2012 | Neubauer et al. | |
| 9,096,727 | B2 | 8/2015 | Ma et al. | |
| 9,217,081 | B2 | 12/2015 | Cardoen et al. | |
| 9,339,117 | B1 | 5/2016 | Limer et al. | |
| 2002/0193028 | A1 * | 12/2002 | Zuckerman | D06N 3/0061 |
| | | | | 442/182 |
| 2004/0102568 | A1 | 5/2004 | Bridgewater et al. | |
| 2004/0126558 | A1 | 7/2004 | Williams et al. | |
| 2010/0087115 | A1 | 4/2010 | Davis et al. | |
| 2013/0085200 | A1 | 4/2013 | Aou et al. | |
| 2013/0202258 | A1 | 8/2013 | Mehan | |
| 2013/0225706 | A1 * | 8/2013 | Ma | C08G 18/4845 |
| | | | | 521/110 |
| 2015/0067967 | A1 | 3/2015 | Tyree | |
| 2015/0150380 | A1 * | 6/2015 | Oh | A47C 7/18 |
| | | | | 297/452.48 |

FOREIGN PATENT DOCUMENTS

| | | |
|---|---|---|
| EP | 1422276 | 2/2006 |
| JP | 2003011256 | 1/2003 |
| JP | 2005082787 A * | 3/2005 |
| WO | 2008021034 | 2/2008 |
| WO | 2010042566 | 4/2010 |
| WO | 2012033674 | 3/2012 |

OTHER PUBLICATIONS

Herk et al. Emulsion Polymerization. Encyclopedia of Polymer Science and Technology. John Wiley & Sons, Inc. 2009 (Year: 2009).*

Larranaga et al. Hawley's Condensed Chemical Dictionary. Sixteenth Edition. John Wiley & Sons, Inc. 2016. pp. 814 and 1026. ( Year: 2016).*

Reyes-Mercado et al. Effect of the acrylic acid content on the permeability and water uptake of latex films. arXiv.0709.2896 [cond-mat.stat-mech]. https://arxiv.org/abs/0709.2896. Sep. 18, 2007. (Year: 2007).*

Lubrizol. Hycar T-9202 Product Data Sheet. Apr. 3, 2025. (Year: 2025).*

Machine Translation of JP2005-082787A. Mar. 31, 2005. (Year: 2005).*

Delgado et. al., "Review on phase change material emulsions and microencapsulated phase change material slurries: Materials, heat transfer studies and applications", Renewable and Sustainable Energy Reviews, 2012, vol. 16, No. 1, pp. 253-273.

Sharma et. al., "Review on thermal energy storage with phase change materials and applications", Renewable and 2 Sustainable Energy Reviews, 2009, vol. 13, pp. 318-345.

* cited by examiner

VISCOELASTIC POLYURETHANE FOAM WITH COATING

FIELD

Embodiments relate to viscoelastic polyurethane foams prepared using a preformed aqueous polymer dispersion and a method of manufacturing such viscoelastic polyurethane foams.

INTRODUCTION

Flexible, viscoelastic polyurethane foam (also known as slow-recovery foam, memory foam, and high-damping foam) is characterized by relatively slow, gradual recovery from compression and the viscoelastic foam may have a relatively lower resiliency. Exemplary applications for viscoelastic foam utilize the foam's characteristics such as shape conforming, energy attenuating, and/or sound damping. For example, the viscoelastic polyurethane foam may be used in comfort applications (such as bedding and pillows), shock absorbing applications (such as in athletic padding and helmets), in soundproof applications (such as automotive interiors), noise and/or vibration dampening applications (such as earplugs, automobile panels, etc.), and filtration applications (such as vacuum air filters, gutter guards for protecting rain gutter/rain catcher against debris such as plant leaves and melting snow).

Coatings for foams, such as viscoelastic foams, are proposed to minimize, reduce, and/or avoid issues as related to warm sleep (also called "sleeping hot" or "hot sleep") that may result, in part, from a lack of sufficient thermal and/or moisture transfer from the human body to the environment. For example, warm sleep may be, in part, resulting from a blanket on top of the human body and/or from the mattress underneath the human body. Solid polymer gel layers coated or laminated (either in the mold or during post-fabrication steps) on polyurethane based foam pillows have been suggested, e.g., due to the greater solid mass and contact area ("heat sink effect") such gel layers may provide compared with the foam itself (which foam may be mostly air). The non-breathable nature of a solid polymer gel is not seen as a problem for pillows, since the human head is not usually covered by a blanket during sleep, leaving the human head exposed to the room air for extra cooling. However, for mattress materials, where blankets cover the human body during use, it is thought that the non-breathable nature of solid polymer gels leads to a disadvantage (such as warm sleep, elevated moisture levels near the body that leads to discomfort, etc.) that is not overcome by the "heat sink effect." So different solutions are sought.

SUMMARY

Embodiments may be realized by providing a coated viscoelastic polyurethane foam that includes a viscoelastic polyurethane foam having the coating thereon, the viscoelastic polyurethane foam having a resiliency of less than or equal to 20% as measured according to ASTM D3574, and a coating material on and embedded within the viscoelastic polyurethane foam, the coating material including an aqueous polymer emulsion and an encapsulated phase change material.

DETAILED DESCRIPTION

Figure 1:
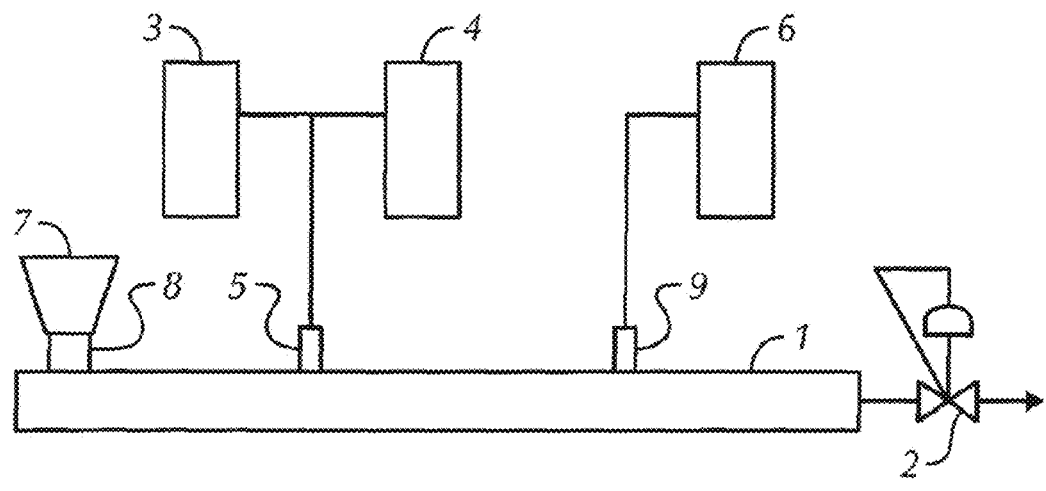
FIG. 1 illustrates an exemplary schematic representation of a melt-extrusion apparatus used to prepare a preformed aqueous polymer dispersion.

A foam may be filled with a coating material applied on the foam, such as from a top side of the foam. The coating material with the foam, may still maintains maintain a high degree of breathability as measured by the ASTM D3574 Test G (air flow test). The coating material may include a phase change material and may be prepared using an aqueous polymer emulsion (also referred to as a latex or latex binder). The coatings may be used on other types of foam, including such polyurethane foams as high resiliency polyurethane based foam, slabstock polyurethane based foam, and rigid polyurethane based foam. The coatings may be used with free-rise foam and molded foam. The foams may be referred to as hydrophilic foam. The coating may be on and/or embedded within the foam. For example, the coating may be both directly on an outer surface (e.g., top surface facing an end user) of the foam and embedded within voids in the foam polymer matrix. The coating may be on the cell struts of the foam.

Embodiments relate to using the coating on a viscoelastic polyurethane foam, which may be characterized as having a resiliency that is less than or equal to 20% as measured according to ASTM D3574 Test H (may also be referred to as a Ball Rebound Test). For example, the resiliency may be less than 15%, less than 10%, less than 8%, less than 7%, less than 4%, and/or less than 3%. The resiliency may be greater than 1%. Viscoelastic polyurethane foams may be prepared using a reaction system that includes an isocyanate component and an isocyanate-reactive component. In particular, the viscoelastic foam is formed as the reaction product of the isocyanate component and the isocyanate-reactive component. The isocyanate component includes at least one isocyanate such as an isocyanate-terminated prepolymer and/or a polyisocyanate. The isocyanate-reactive component includes at least one compound having an isocyanate reactive hydrogen atom group, such as a hydroxyl group and/or an amine group. The isocyanate component and/or the isocyanate-reactive component may include an additive such a catalyst, a curing agent, a surfactant, a blowing agent, a polyamine, and/or a filler.

According to embodiments, the isocyanate-reactive component includes at least three components. In particular, the isocyanate-reactive component includes a polyol component, an additive component, and a preformed aqueous polymer dispersion.

The polyol component accounts for 50.0 wt % to 99.8 wt % (e.g., 60.0 wt % to 99.8 wt %, 70.0 wt % to 99.5 wt %, 80.0 wt % to 99.0 wt %, 90.0 wt % to 99.0 wt %, etc., so as to be the majority component in the reaction system for forming the viscoelastic polyurethane foam) of the isocyanate-reactive component. The polyol component includes at least one polyether polyol and may optionally include at least one polyester polyol.

The additive component may include a catalyst, a curing agent, a surfactant, a blowing agent, a polyamine, water, and/or a filler. The additive component accounts for 0.1 wt % to 50.0 wt % (e.g., 0.1 wt % to 40.0 wt %, 0.1 wt % to 30.0 wt %, 0.1 wt % to 20.0 wt %, 0.1 wt % to 15.0 wt %, 0.1 wt % to 10.0 wt %, 0.1 wt % to 5.0 wt %, etc.) of the additive component, based on the total weight of the isocyanate-reactive component. The additive component in exemplary embodiments includes at least one catalyst and at least one surfactant.

The optional preformed aqueous polymer dispersion may account for 0.1 wt % to 6.0 wt % (e.g., 0.1 wt % to 5.0 wt %, 0.1 wt % to 4.1 wt %, 0.1 wt % to 4.0 wt %, 0.1 wt % to 3.5 wt %, 0.1 wt % to 3.0 wt %, 0.4 wt % to 2.5 wt %, 0.5 wt % to 2.4 wt %, etc.) of the isocyanate-reactive component. The preformed aqueous polymer dispersion is one of an aqueous acid polymer dispersion or an aqueous acid-modified polyolefin polymer dispersion in which the polyolefin is derived from at least one $C_2$ to $C_{20}$ alpha-olefin (e.g., at least one $C_2$ to $C_{10}$ alpha-olefin and/or $C_2$ to $C_8$ alpha-olefin). The preformed aqueous polymer dispersion has a solids content from 10 wt % to 80 wt %, based on the total weight of the preformed aqueous polymer dispersion. The aqueous polymer dispersion may be a combination of one or more aqueous polymer dispersions that are used to form the viscoelastic polyurethane foam.

The viscoelastic foam may be a free rise foam or mold foam that is optionally be prepared using at least one selected from the group of the preformed aqueous polymer dispersion and preformed aqueous polymer dispersant, whereas they differ from each other by composition. Exemplary embodiments may include the preformed aqueous polymer dispersion only, the preformed aqueous polymer dispersant only, or a combination of the preformed aqueous polymer dispersion and the preformed aqueous polymer dispersant.

The viscoelastic foam prepared using the preformed aqueous polymer dispersant additive may have an air flow greater than 4.0 standard cubic foot per minute (scfm) (approximately 2.4 L/s) under standard conditions. The viscoelastic foam may have an air flow greater than 5.0 standard cubic foot per minute (scfm) (approximately 2.4 L/s) under standard conditions. The viscoelastic foam may have a recovery time (also referred to as viscoelastic recovery time) of less than 20 seconds (e.g., less than 10 seconds and/or less than 5 seconds). For example, a viscoelastic polyurethane foam may be prepared that has an increased air flow without sacrificing resiliency.

The viscoelastic foam may be coated with a coating material. The coating material may be both on an outer surface of the viscoelastic foam and embedded within voids in the viscoelastic foam polymer matrix. The coating material includes an encapsulated phase change material Polyol Component The polyol component includes at least one polyether polyol and/or polyester polyol. Exemplary polyether polyols are the reaction product of alkylene oxides (such as at least one ethylene oxide, propylene oxide, and/or butylene oxide) with initiators containing from 2 to 8 active hydrogen atoms per molecule. Exemplary initiators include ethylene glycol, diethylene glycol, propylene glycol, dipropylene glycol, butane diol, glycerol, trimethylolpropane, triethanolamine, pentaerythritol, sorbitol, ethylene diamine, toluene diamine, diaminodiphenylmethane, polymethylene polyphenylene polyamines, ethanolamine, diethanolamine, and mixtures of such initiators. Exemplary polyols include VORANOL™ products, available from The Dow Chemical Company. The polyol component may include polyols that are useable to form viscoelastic polyurethane foams.

For example, the polyol component may include a polyoxyethylene-polyoxypropylene polyether polyol that has an ethylene oxide content of at least 50 wt % (based on a total weight of the alkylene oxides used to form the polyol), that has a nominal hydroxyl functionality from 2 to 4), and has a number average molecular weight from 500 g/mol to 5000 g/mol (e.g., 500 g/mol to 4000 g/mol, from 600 g/mol to 3000 g/mol, 600 g/mol to 2000 g/mol, 700 g/mol to 1500 g/mol, and/or 800 g/mol to 1200 g/mol). The polyoxyethylene-polyoxypropylene polyether polyol that has an ethylene oxide content of at least 50 wt % may account for 5 wt % to 90 wt % (e.g., 10 wt % to 90 wt %, 25 wt % to 90 wt %, 25 wt % to 85 wt %, 35 wt % to 85 wt %, 45 wt % to 85 wt %, 50 wt % to 80 wt %, and/or 55 wt % to 70 wt %) of the isocyanate-reactive component. The polyoxyethylene-polyoxypropylene polyether polyol that has an ethylene oxide content of at least 50 wt % may be the majority component in the isocyanate-reactive component.

The polyol component may include a high molecular weight polyoxyethylene-polyoxypropylene polyether polyol that has an ethylene oxide content of at least 50 wt % (based on a total weight of the alkylene oxides used to form the polyol), that has a nominal hydroxyl functionality from 4 to 8 (e.g., 5 to 8), and has a number average molecular weight from 5,500 g/mol to 20,000 g/mol (e.g., 5,500 g/mol to 17,500 g/mol, from 5,500 g/mol to 15,500 g/mol, 5,500 g/mol to 14,500 g/mol, 6,500 g/mol to 14,500 g/mol, 8,500 g/mol to 14,500 g/mol, and/or 10,500 g/mol to 14,500 g/mol). The polyoxyethylene-polyoxypropylene polyether polyol that has an ethylene oxide content of at least 50 wt % may account for 5 wt % to 90 wt % (e.g., 5 wt % to 75 wt %, 5 wt % to 55 wt %, 5 wt % to 50 wt %, 5 wt % to 45 wt %, 5 wt % to 35 wt %, 5 wt % to 25 wt %, and/or 10 wt % to 20 wt %) of the isocyanate-reactive component. The high molecular weight polyoxyethylene-polyoxypropylene polyether polyol may be in addition to the relatively lower molecular weight polyoxyethylene-polyoxypropylene polyether polyol discussed above.

The polyol component may include a polyoxypropylene-polyoxyethylene polyether polyol that has an ethylene oxide content of less than 20 wt % (based on a total weight of the alkylene oxides used to form the polyol), that has a nominal hydroxyl functionality from 2 to 6 (e.g., 2 to 4), and has a number average molecular weight greater than 1000 g/mol (or greater than 1500 g/mol) and less than 6000 g/mol. For example, the molecular weight may be from 1500 g/mol to 5000 g/mol, 1600 g/mol to 5000 g/mol, 2000 g/mol to 4000 g/mol, and/or 2500 g/mol to 3500 g/mol. The polyoxypropylene-polyoxyethylene polyether polyol that has an ethylene oxide content of less than 20 wt % may account for 5 wt % to 90 wt % (e.g., 5 wt % to 70 wt %, 5 wt % to 50 wt %, 10 wt % to 40 wt %, and/or 10 wt % to 30 wt %) of the isocyanate reactive component. The polyoxypropylene-polyoxyethylene polyether polyol that has an ethylene oxide content of less than 20 wt % may be in a blend with the polyoxypropylene polyether polyol that has an ethylene oxide content of at least 50 wt %, whereas the latter of which is included in a greater amount.

The polyol component may include a polyoxypropylene polyether polyol that has a nominal hydroxyl functionality from 2 to 6 (e.g., 2 to 4) and has a number average molecular weight from 500 g/mol to 6000 g/mol (e.g., 500 g/mol to 5500 g/mol, from 600 g/mol to 5000 g/mol, 700 g/mol to 1500 g/mol, 800 g/mol to 1200 g/mol, 3000 g/mol to 6000 g/mol, 3000 g/mol to 5500 g/mol, 3500 g/mol to 5500 g/mol, and/or 4500 g/mol to 5500 g/mol). The polyoxypropylene polyether polyol may account for 5 wt % to 90 wt % (e.g., 5 wt % to 70 wt %, 5 wt % to 50 wt %, 10 wt % to 40 wt %, and/or 10 wt % to 30 wt %) of the isocyanate reactive component. The polyoxypropylene polyether polyol may be in a blend with the polyoxypropylene polyether polyol that has an ethylene oxide content of at least 50 wt %, whereas the latter of which is included in a greater amount.

In an exemplary embodiment, the polyol component may include a blend of the polyoxyethylene-polyoxypropylene polyether polyol that has an ethylene oxide content of at least 50 wt %, the polyoxyethylene-polyoxypropylene polyether polyol that has an ethylene oxide content of less than 20 wt %, and/or the polyoxypropylene polyether polyol. In other exemplary embodiments, the polyol component may include a blend of the polyoxyethylene-polyoxypropylene polyether polyol that has an ethylene oxide content of at least 50 wt %, the higher molecular weight polyoxyethylene-polyoxypropylene polyether polyol that has an ethylene oxide content of at least 50 wt %, the polyoxyethylene-polyoxypropylene polyether polyol that has an ethylene oxide content of less than 20 wt %, and/or the polyoxypropylene polyether polyol.

The polyol component may be mixed with the preformed aqueous polymer dispersion (and optionally at least part of the additive component) before contacting the isocyanate component.

Additive Component

The additive component is separate from the components that form the preformed aqueous dispersion and the polyol component. The additive component is part of the isocyanate-reactive component, but other additives may be incorporated into the isocyanate component. The additive component may include a catalyst, a curing agent, a crosslinker, a surfactant, a blowing agent (aqueous and non-aqueous, separate from the aqueous polymer dispersion), a polyamine, a plasticizer, a fragrance, a pigment, an antioxidant, a UV stabilizer, water (separate from the aqueous polymer dispersion), and/or a filler. Other exemplary additives include a chain extender, flame retardant, smoke suppressant, drying agent, talc, powder, mold release agent, rubber polymer ("gel") particles, and other additives that are known in the art for use in viscoelastic foams and viscoelastic foam products.

The additive component may include tin catalyst, zinc catalyst, bismuth catalyst, and/or amine catalyst. The total amount of catalyst in the isocyanate-reactive component may be from 0.1 wt % to 3.0 wt %.

A surfactant may be included in the additive component, e.g., to help stabilize the foam as it expands and cures. Examples of surfactants include nonionic surfactants and wetting agents such as those prepared by the sequential addition of propylene oxide and then ethylene oxide to propylene glycol, solid or liquid organosilicones, and polyethylene glycol ethers of long chain alcohols. Ionic surfactants such as tertiary amine or alkanolamine salts of long chain alkyl acid sulfate esters, alkyl sulfonic esters, and alkyl arylsulfonic acids may be used. For example, the formulation may include a surfactant such as an organosilicone surfactant. The total amount of an organosilicone surfactant in the isocyanate-reactive component may be from 0.1 wt % to 5.0 wt %, 0.1 wt % to 3.0 wt %, 0.1 wt % to 2.0 wt %, and/or 0.1 wt % to 1.0 wt %.

The additive component may include water, which is separate from the preformed aqueous polymer dispersion. The water may account for less than 2.0 wt % of the total weight of isocyanate-reactive component. The total water, including water from the preformed aqueous polymer dispersion and water from the additive component, may account for less than 5 wt % of the total weight of isocyanate-reactive component.

The additive component may exclude any conventional polyurethane foam chemical cell openers based on the use of the aqueous polymer dispersion. The additive component may exclude polybutene, polybutadiene, and waxy aliphatic hydrocarbons such as oils (e.g., mineral oil, paraffin oil, and/or naphthenic oil) that are commonly employed cell openers in low resiliency foams. The additive component may exclude cell openers that are polyols derived primarily from alkoxylation of α,β-alkylene oxides having at least 4 carbon atoms, e.g., as discussed U.S. Pat. No. 4,596,665. The additive component may exclude cell openers that are polyethers of up to about 3500 molecular weight that contain a high proportion (usually 50 percent or higher) of units derived from ethylene oxide or butylene oxide, e.g., as discussed in the background section of U.S. Pat. No. 4,863, 976. The additive component may exclude cell openers that are polyether polyols having a molecular weight of at least 5000 and having at least 50 wt % of oxyethylene units, e.g., as discussed in the claims of U.S. Pat. No. 4,863,976.

Isocyanate Component

The isocyanate component includes at least one isocyanate. The isocyanate component is present at an isocyanate index from 50 to 150 (e.g., from 60 to 140, from 65 to 130, from 65 to 100, from 65 to 95, from 65 to 90, and/or from 65 to 85). The isocyanate index is defined as the molar stoichiometric excess of isocyanate moieties in a reaction mixture with respect to the number of moles of isocyanate-reactive units (active hydrogens available for reaction with the isocyanate moiety), multiplied by 100. An isocyanate index of 100 means that there is no stoichiometric excess, such that there is 1.0 mole of isocyanate groups per 1.0 mole of isocyanate-reactive groups, multiplied by 100.

The isocyanate component may include one or more isocyanate such as polyisocyanate and/or isocyanate-terminated prepolymer. The isocyanate may be isocyanate-containing reactants that are aliphatic, cycloaliphatic, alicyclic, arylaliphatic, and/or aromatic polyisocyanates or derivatives thereof. Exemplary derivatives include allophanate, biuret, and NCO (isocyanate moiety) terminated prepolymer. For example, the isocyanate component may include at least one aromatic isocyanate, e.g., at least one aromatic polyisocyanate or at least one isocyanate-terminated prepolymer derived from an aromatic polyisocyanate. The isocyanate component may include at least one isomer of toluene diisocyanate (TDI), crude TDI, at least one isomer of diphenyl methylene diisocyanate (MDI), crude MDI, and/or higher functional methylene polyphenyl polyisocyanate. Examples include TDI in the form of its 2,4 and 2,6-isomers and mixtures thereof and MDI in the form of its 2,4'-, 2,2'- and 4,4'-isomers and mixtures thereof. The mixtures of MDI and oligomers thereof may be crude or polymeric MDI and/or a known variant of MDI comprising urethane, allophanate, urea, biuret, carbodiimide, uretonimine and/or isocyanurate groups. Exemplary isocyanates include VORANATE™ M 220 (a polymeric methylene diphenyl diisocyanate available from The Dow Chemical Company). Other exemplary polyisocyanate include tolylene diisocyanate (TDI), isophorone diisocyanate (IPDI) and xylene diisocyanates (XDI), and modifications thereof.

Preformed Aqueous Polymer Dispersion

The aqueous polymer dispersion includes at least (a) a base polymer including an acid polymer and/or an acid-modified polyolefin polymer and (b) a fluid medium (in this case water), in which the base polymer is dispersed in the fluid medium. The preformed aqueous polymer dispersion may be a continuous liquid phase component at ambient conditions of room temperature and atmospheric pressure and is derived from a liquid phase (i.e., the fluid medium) and a solid phase (i.e., the base polymer).

In embodiments, the preformed aqueous polymer dispersion is one of an aqueous acid polymer dispersion or an aqueous acid-modified polyolefin polymer dispersion in which the polyolefin is derived from at least one $C_2$ to $C_{20}$ alpha-olefin. By aqueous acid polymer dispersion it is meant an aqueous dispersion prepared with an acid based polymer. By aqueous acid-modified polyolefin polymer dispersion it is meant an aqueous dispersion prepared with an acid-modified polyolefin polymer. By derived from at least one $C_2$ to $C_{20}$ alpha-olefin it is meant that the polyolefin is a polymer prepared using at least one alpha-olefin, in which each alpha-olefin used is one of a $C_2$ to $C_{20}$ alpha-olefin (e.g., the polyolefin may be derived from at least one of ethylene, propylene, butylene, hexene, and/or octene). In exemplary embodiments, the polyolefin may be an ethylene based polymer and/or a propylene based polymer As used herein, by polymer it meant a compound prepared by polymerizing monomers, whether of the same or a different type. Thus, the term polymer embraces the term homopolymer, usually employed to refer to polymers prepared from only one type of monomer, and the term interpolymer. It also embraces all forms of interpolymers, e.g., random, block, homogeneous, heterogeneous, etc. By copolymer/interpolymer it is meant a polymer prepared by the polymerization of at least two different types of monomers. These terms include both classical copolymers, i.e., polymers prepared from two different types of monomers, and polymers prepared from more than two different types of monomers, e.g., terpolymers, tetrapolymers, etc.

By ethylene based polymer it is meant a polymer that includes a majority weight percent polymerized ethylene monomer (based on the total weight of polymerizable monomers), and optionally may comprise at least one polymerized comonomer different from ethylene (such as at least one selected from a $C_3$ to $C_{20}$ alpha-olefin) so as to form an ethylene-based interpolymer. For example, when the ethylene-based polymer is an ethylene-propylene copolymer, the amount of ethylene may be greater than 50 wt %, based on the total weight to the copolymer. "Units derived from ethylene" and like terms mean the units of a polymer that formed from the polymerization ethylene monomers.

By propylene based polymer it is meant a polymer that includes a majority weight percent polymerized propylene monomer (based on the total weight of polymerizable monomers), and optionally may comprise at least one polymerized comonomer different from propylene (such as at least one selected from a $C_2$ and $C_4$ to $C_{20}$ alpha-olefin) so as to form an propylene-based interpolymer. For example, when the propylene-based polymer is a propylene-ethylene copolymer, the amount of propylene may be greater than 50 wt %, based on the total weight to the copolymer. "Units derived from propylene" and like terms mean the units of a polymer that formed from the polymerization propylene monomers.

Exemplary aqueous acid polymer dispersion may include ethylene-acrylic acid interpolymers, ethylene-methacrylic acid interpolymers, and/or ethylene-crotonic acid interpolymers. The ethylene-acrylic acid interpolymer is prepared by the copolymerization of at least ethylene and acrylic acid. The ethylene-methacrylic acid interpolymer is prepared by copolymerization of at least ethylene and methacrylic acid. The ethylene-crotonic acid interpolymer is prepared by copolymerization of at least ethylene and crotonic acid. It is understood that in such an aqueous acid polymer dispersion, exemplary embodiments are not limited to just ethylene-acrylic acid interpolymers, ethylene-methacrylic acid interpolymers, and/or ethylene-crotonic acid interpolymers. For example, ethylene can be copolymerized with more than one of the following: acrylic acid, methacrylic acid, and/or crotonic acid.

Exemplary aqueous acid polymer dispersions may include at least one ethylene-acrylic acid (EAA) copolymer (and/or ethylene-methacrylic acid copolymer) as the base polymer that is dispersed in the fluid medium (in this case water). The dispersion may be enabled by BLUEWAVE™ Technology, which is a proprietary and patented mechanical-dispersion technology that is a trademark of The Dow Chemical Company or an affiliated company of The Dow Chemical Company. For example, the EAA may be prepared by copolymerization of ethylene with acrylic acid, which yields ethylene-acrylic acid EAA copolymers. The ethylene-acrylic acid copolymer may have an acrylic acid content of at least 10 wt % (e.g., from 10 wt % to 70 wt %, from 10 wt % to 60 wt %, from 10 wt % to 50 wt %, from 10 wt % to 40 wt %, from 10 wt % to 30 wt %, and/or from 15 wt % to 25 wt %). Exemplary EAA copolymers are available as PRIMACOR™ products, available from THE DOW CHEMICAL COMPANY. The EAA copolymer may have a melt index from 100 to 2000 g/10 minute (ASTM Method D-1238 at 190° C. and 2.16 kg). The EAA copolymer may have a Brookfield viscosity from 5,000 to 13,000 cps at 350° F., and is available from The Dow Chemical Company.

The ethylene-methacrylic acid copolymer may be prepared by copolymerization of ethylene with methacrylic acid. Exemplary, ethylene-acrylic acid, ethylene-methacrylic acid, and/or ethylene-crotonic acid copolymers are discussed in U.S. Pat. Nos. 4,599,392 and/or 4,988,781.

Exemplary aqueous acid-modified polyolefin polymer dispersions include dispersions sold as HYPOD™ products, available from The Dow Chemical Company. The HYPOD™ products may be enabled by BLUEWAVE™ Technology, which is a proprietary and patented mechanical-dispersion technology that is a trademark of The Dow Chemical Company or an affiliated company of The Dow Chemical Company. BLUEWAVE™ Technology may utilize a high-shear mechanical process that may work by taking traditional thermoplastic polymers and elastomers and breaking them up into submicron particles. The aqueous acid-modified polymer dispersions may include propylene based dispersions and ethylene-based dispersions, which may combine the performance of high-molecular-weight thermoplastics and elastomers with the application advantages of a high-solids waterborne dispersion. The polyolefin of the dispersion may be a metallocene catalyzed polyolefin. Exemplary polyolefins are sold in the AFFINITY™, ENGAGE™, VERSIFY™, and INFUSE™ products, available from The Dow Chemical Company.

The aqueous polymer dispersion may be prepared by using a neutralizing agent. Exemplary neutralizing agents include ammonia, ammonium hydroxide, potassium hydroxide, sodium hydroxide, lithium hydroxide, and combinations thereof. For example, if a polar group of the base polymer is acidic or basic in nature, the polymer may be partially or fully neutralized with a neutralizing agent to form a corresponding salt. With the acid polymer modified dispersion prepared using EAA is used, the neutralizing agent is a base, such as ammonium hydroxide, potassium hydroxide, and/or sodium hydroxide. Those having ordinary skill in the art will appreciate that the selection of an appropriate neutralizing agent may depend on the specific composition formulated, and that such a choice is within the knowledge of those of ordinary skill in the art.

The aqueous polymer dispersion may be prepared in an extrusion process, e.g., as discussed in U.S. Pat. No. 8,318, 257. FIG. 1 illustrates an exemplary a schematic diagram of an extrusion apparatus for manufacturing an aqueous polymer dispersions. An extruder 1 (such as a twin screw extruder) may be coupled to a pressure control device 2 (such as a pressure control valve, a back pressure regulator, a melt pump, and/or a gear pump). A neutralizing agent reservoir 3 and an initial water reservoir 4, each of which includes a pump (not shown), may be provided in connection with the extruder 1. The desired amounts of neutralizing agent and initial water are provided from the neutralizing agent reservoir 3 and the initial water reservoir 4, respectively. Any suitable pump may be used, e.g., based on the desired flow. The neutralizing agent and initial water may be preheated in a preheater.

Polymer resin (such as an acid polymer and/or a polyolefin polymer) may be fed from the feeder 7 to an inlet 8 of the extruder 1, where the resin is melted or compounded. The polymer resin may be provided in the form of pellets, powder, and/or flakes, for example. A dispersing agent may be added to the extruder through and along with the polymer resin or may be provided separately to the extruder 1. For example, the polymer (and dispersing agent if included) may be melted, mixed, and conveyed by screws in a mix and convey zone. The polymer resin melt is then delivered from the mix and convey zone to an emulsification zone of the extruder where the initial amounts of water and neutralizing agent (from the reservoirs 3 and 4) are added through an inlet 5. The resultant emulsified mixture may be further diluted at least one time using an additional water via inlet 9 from reservoir 6 in a dilution and cooling zone of the extruder 1. As would be understood by a person of ordinary skill in the art, at least in view of U.S. Pat. No. 8,318,257, the dilution scheme of the resultant emulsified mixture may be varied (e.g., based on the desired solids content). For example, the emulsified mixture may be further diluted with additional dispersion medium from additional reservoirs in a dilution zone of the extruder 1. The dispersion may be diluted to at least 30 weight percent dispersion in the dilution zone.

With respect to the screws in the mix and convey zone, one or more rotating restriction orifices may be located along the screw. The rotating restriction orifice may improve stability of the dispersion forming process. Non-rotating restriction orifices may be used. The screws may include high-mixing kneading disks, in some embodiments. In addition to the high-mixing kneading disks described above and optionally low free volume kneading disks, which may minimize the volume weighted particle size distribution of dispersions formed using the extruder 1.

The extruder 1 includes high internal phase emulsion creation (HIPE) zones along a length thereof, e.g., as discussed in U.S. Pat. No. 8,318,257. For example, the aqueous polymer dispersion may be prepared using a system that incorporates 12 HIPE zones, in which the temperature is varied in the zones. Depending upon the feed composition (such as the polymer, dispersing agent, neutralizing agent, etc.), it may be desirable to have a longer or a shorter HIPE zones. Multiple dispersion medium injection points may be provided to allow the HIPE zones to be extended or shortened as needed. As the particle size of the dispersed polymer particles is formed in the HIPE zone, adequate mixing should be provided to develop the desired particle size. Having a variable length for the HIPE zone may allow for a broader range of polymers to be processed in a single extruder, providing for process flexibility, among other benefits.

The twin screw extruder barrels, screws, and dilution medium injection points may be varied such that the length to diameter (L/D) of the HIPE zone is at least 16 when producing EEA containing dispersions. The apparatuses described above may be used to produce dispersions, where, in some embodiments, the polymer feed rate may range from about 50 to about 2000 lb/h (about 22 to about 907 kg/h). In other embodiments, the polymer feed rate may range from about 100 to about 1000 lb/h (between about 45 and about 454 kg/h). In other embodiments, the screw speed may range from about 300 rpm to about 1200 rpm. In yet other embodiments, the extruder discharge pressure may be maintained at a pressure ranging from about 300 to about 800 psig (from about 21 bar to about 56 bar).

Preformed Aqueous Polymer Dispersant

The preformed aqueous polymer dispersant includes at least (a) a polymeric component that includes a base polymer that is derived from 20 wt % to 100 wt % (e.g., 30 wt % to 100 wt %, 40 wt % to 100 wt %, 50 wt % to 100 wt %, etc.) of at least one hydrophilic acid monomer having at least one carbonyl group, phosphate group, phosphonate group, or sulfonyl group, or other acidic groups (which includes any combination thereof), and optionally derived from at least one hydrophobic terminally unsaturated hydrocarbon monomer; and (b) a fluid medium that includes at least water, in which the base polymer is dispersed in the fluid medium. As used herein, by polymer it meant a compound prepared by polymerizing monomers, whether of the same or a different type. Thus, the term polymer embraces the term homopolymer, usually employed to refer to polymers prepared from only one type of monomer, and the term interpolymer. It also embraces all forms of interpolymers, e.g., random, block, homogeneous, heterogeneous, etc. By copolymer/interpolymer it is meant a polymer prepared by the polymerization of at least two different types of monomers. These terms include both classical copolymers, i.e., polymers prepared from two different types of monomers, and polymers prepared from more than two different types of monomers, e.g., terpolymers, tetrapolymers, etc. The base polymer may be derived from one monomer or may be a copolymer derived from at least two different monomers. The base polymer may have controlled microstructure, molecular weight distribution, and/or molecular weight. The base polymer may have a number average molecular weight ($M_n$) from 1000 to 25,000 g/mol.

$M_n$ refers to the number average molecular weight of the dispersant, e.g., as determined by any the following method: dispersants are dissolved at a concentration of 2 mg/mL in a 20 mM solution of sodium dihydrogen phosphate at pH 7 and passed through a 0.45 μm filter and 100 μL injected into a TSKgel GMPW XL packed column (7.5 mm×30 cm, Tosoh) in tandem with a TSKgel G2500PW XL packed column (7.5 mm×30 cm, Tosoh) at a flow rate of 1 mL/min. The elution is monitored by a refractive index detector and molecular weight profile assessed versus poly(acrylic acid) reference standards ranging in molecular weight from 216 g/mol to 1,100,000 g/mol.

For example, the base polymer may be derived from at least one hydrophilic acid monomer having at least one carbonyl group, e.g., derived from an ethylenically unsaturated carboxylated monomer or derived from a monomer that can be hydrolyzed to give multiple carboxylic acid functional groups. Examples of ethylenically unsaturated carboxylated monomers include acrylic acid, crotonic acid, methacrylic acid, cinnamic acid, alpha-chloroacrylic acid, maleic acid, itaconic acid, fumaric acid, glutaconic acid, traumatic acid, citraconic acid, mesaconic acid, and aconitic acid. Examples of monomers that can be hydrolyzed to give multiple carboxylic acid functional groups include maleic anhydride, citraconic anhydride, itaconic anhydride, tetrahydrophthalic anhydride, traumatic anhydride, and glutaconic anhydride. For example, the monomers that can be hydrolyzed to give multiple carboxylic acid functional groups may be an acid anhydride. In exemplary embodiments, the hydrophilic acid monomer may be a carboxylic acid having more than one carbonyl group or an acid anhydride.

The base polymer may be derived from at least one hydrophilic acid monomer having at least one phosphate group, e.g., derived from phosphoric acid or esters thereof (e.g., ones known to a person of ordinary skill in the art). The base polymer may be derived from at least one hydrophilic acid monomer having at least one phosphonate group, e.g., derived from phosphonic acids or esters thereof (e.g., ones known to a person of ordinary skill in the art). The base polymer may be derived from at least one hydrophilic acid monomer having at least one sulfonyl group, e.g., derived from sulfonic acid or substituents obtained from sulfonic acid (e.g., ones known to a person of ordinary skill in the art).

In exemplary embodiments, the base polymer may be derived from any combination of the hydrophilic acid monomers having at least one carbonyl group (such as an acid anhydride group) phosphate group, phosphonate group, or sulfonyl group. For example, the base polymer may be a copolymer derived from two different hydrophilic acid monomers, e.g., derived from two different ethylenically unsaturated carboxylated monomers, derived from two different monomers that can be hydrolyzed to give multiple carboxylic acid functional groups. For example, the base polymer may be derived from one ethylenically unsaturated carboxylated monomer and one monomer that can be hydrolyzed to give multiple carboxylic acid functional groups.

In further exemplary embodiments, the base polymer may be derived from any combination of the of the hydrophilic acid monomers having at least one carbonyl group (such as an acid anhydride group), phosphate group, phosphonate group, or sulfonyl group, and a hydrophobic terminally unsaturated hydrocarbon monomer. For example, the base polymer may be derived from one monomer that can be hydrolyzed to give multiple carboxylic acid functional groups and one hydrophobic terminally unsaturated hydrocarbon monomer.

Examples of the hydrophobic terminally unsaturated hydrocarbon monomers include $C_2$ to $C_{20}$ alpha-olefins, ethylenically unsaturated aromatic compounds (such as styrene), and alkyl esters of ethylenically unsaturated carboxylated monomers (such as methyl acrylate, ethyl acrylate, butyl acrylate, methyl methacrylate, ethyl methacrylate, and butyl methacrylate). For example, the hydrophobic terminally unsaturated hydrocarbon monomer may be one of selected from a $C_2$ to $C_{10}$ alpha-olefin or may be styrene. Nonlimiting examples of a sulfonated ethylenically unsaturated monomer include 2-acrylamido-2-methylpropane sulfonic acid and its salts. Nonlimiting examples of a phosphated ethylenically unsaturated monomer include 2-(phosphonooxy)ethyl methacrylate and its salts. Nonlimiting examples of a phosphonated ethylenically unsaturated monomer include vinylphosphonic acid and its salts. Exemplary embodiments include at least one ethylenically unsaturated carboxylated monomers.

The preformed aqueous polymer dispersant includes from 5 wt % to 60 wt % (e.g., 5 wt % to 50 wt %, 10 wt % to 50 wt %, 15 wt % to 45 wt %, 15 wt % to 40 wt %, 20 wt % to 36 wt %, etc.) of a polymeric component and from 40 wt % to 95 wt % of a fluid medium that includes at least water. For example, the preformed aqueous polymer dispersant may consist essentially of the polymeric component and the fluid medium. The polymeric component may consist essentially of the base polymer. The preformed aqueous polymer dispersant may contain other components, non-limiting examples include surfactants, organic solvents, initiator and chain transfer residues, and fillers.

The preformed aqueous polymer dispersant has a pH from 6.0 to 12.0 (e.g., from 6.5 to 12.0, from 8.0 to 12.0, from 8.0 to 11.5, from 8.0 to 11.0, from 8.0 to 10.5, from 8.0 to 10.0, etc.). The preformed aqueous polymer dispersant may be a continuous liquid phase component at ambient conditions of room temperature and atmospheric pressure and is derived from a liquid phase (i.e., the fluid medium) and a solid phase (i.e., the base polymer). The preformed aqueous polymer dispersant may have a solids content from 10 wt % to 80 wt % (e.g., from 25 wt % to 75 wt %, etc.), based on the total weight of the preformed aqueous polymer dispersant.

The aqueous polymer dispersant may be prepared by using a neutralizing agent. Exemplary neutralizing agents include ammonia, ammonium hydroxide, potassium hydroxide, sodium hydroxide, lithium hydroxide, calcium hydroxide, magnesium hydroxide, zinc hydroxide, calcium oxide, magnesium oxide, zinc oxide, and combinations thereof. For example, if a polar group of the base polymer is acidic or basic in nature, the polymer may be partially or fully neutralized with a neutralizing agent to form a corresponding salt. For example, with a dispersant prepared using acrylic acid, the neutralizing agent is a base, such as ammonium hydroxide, potassium hydroxide, and/or sodium hydroxide. Those having ordinary skill in the art will appreciate that the selection of an appropriate neutralizing agent may depend on the specific composition formulated, and that such a choice is within the knowledge of those of ordinary skill in the art.

The preformed aqueous polymer dispersant accounts for 0.1 wt % to 6.0 wt % (e.g., 0.1 wt % to 5.0 wt %, 0.1 wt % to 4.1 wt %, 0.1 wt % to 4.0 wt %, 0.1 wt % to 3.5 wt %, 0.1 wt % to 3.0 wt %, 0.4 wt % to 2.5 wt %, 0.5 wt % to 2.4 wt %, etc.) of the isocyanate-reactive component. The aqueous polymer dispersant may be a combination of one or more aqueous polymer dispersants that are used to form the viscoelastic polyurethane foam.

The calculated total water content for the reaction system used to form the viscoelastic foam may be less than 5 wt %, less than 3 wt %, less than 2.0 wt %, and/or less than 1.6 wt %, based on the total weight of the reaction system for forming the viscoelastic polyurethane foam. The calculated total water content is calculated as the total amount of DI (deionized) water added to the formulation plus the amount of water added to the formulation as part of the preformed aqueous polymer dispersant. For example, the calculated total water content may be from 0.5 wt % to 1.6 wt %, 0.5 wt % to 1.5 wt %, and/or 1.0 wt % to 1.5 wt %.

Exemplary aqueous polymer dispersants are sold as TAMOL™ and OROTAN™, products, available from The Dow Chemical Company, and BYK and DISPERBYK products, available from BYK gmbh, and Rhodaline® products, available from Rhodia Group, and Coadis™ products, available from Arkema, and Hydropalat® products, available from BASF.

Viscoelastic Foam

The coated viscoelastic polyurethane foam may be useful in a variety of packaging applications, comfort applications (such as mattresses—including mattress toppers, pillows, furniture, seat cushions, etc.), shock absorber applications (such as bumper pads, sport and medical equipment, helmet liners, etc.), noise and/or vibration dampening applications (such as earplugs, automobile panels, etc.), and filtration applications (such as vacuum air filters, gutter guards for protecting rain gutter/rain catcher against debris such as plant leaves and melting snow).

The viscoelastic polyurethane foam for forming the coated viscoelastic foam may be prepared in a slabstock process (e.g., as free rise foam), a molding process (such as in a box foaming process), or any other process known in the art. The coated may be added to the viscoelastic polyurethane foam after it has been formed. In a slabstock process, the components for forming the foam (e.g., and not the components for forming the coating) may be mixed and poured into a trough or other region where the formulation reacts, expands freely in at least one direction, and cures. Slabstock processes are generally operated continuously at commercial scales. In a molding process, the components for forming the foam may be mixed and poured into a mold/box (heated or non-heated) where the formulation reacts, expands without the mold in at least one direction, and cures. In a molding process, the formulation can also react, and expand inside a mold that can be closed so that the formulation contacts the mold on all sides (with vent hole or holes on at least one side of a mold), and then cures.

The coated viscoelastic polyurethane foam (e.g. the coating and/or foam) may be prepared at initial ambient conditions (i.e., room temperature ranging from 20° C. to 25° C. and standard atmospheric pressure of approximately 1 atm). For example, the viscoelastic polyurethane foam may include an acid polymer and/or an acid-modified polyolefin polymer (e.g., a polymer that has a melting point above 100° C.) without requiring heating or application of pressure to the isocyanate-reactive component. Foaming at pressure below atmospheric condition can also be done, to reduce foam density and soften the foam. Foaming at pressure above atmospheric condition can be done, to increase foam density and therefore the foam load bearing as measured by indentation force deflection (IFD). In a molding processing, the viscoelastic polyurethane foam may be prepared at initial mold temperature above ambient condition, e.g., 50° C. and above. Overpacking of mold, i.e. filling the mold with extra foaming material, can be done to increase foam density.

The calculated total water content for the reaction system used to form the viscoelastic polyurethane foam (excluding the water content of the coating) may be less than 5 wt %, less than 3 wt %, less than 2.0 wt %, and/or less than 1.6 wt %, based on the total weight of the reaction system for forming the viscoelastic polyurethane foam. The calculated total water content is calculated as the total amount of DI (deionized water) added to the formulation plus the amount of water added to the formulation as part of the preformed aqueous polymer dispersion. For example, the calculated total water content may be from 0.5 wt % to 1.6 wt %, 0.5 wt % to 1.5 wt %, and/or 1.0 wt % to 1.5 wt %. The resultant viscoelastic polyurethane foam may exhibit improved wicking effect and/or improved moisture/heat management. With respect to moisture and heat management of a resultant foam, e.g., with respect to a viscoelastic polyurethane foam mattress or pillow, a good wicking effect may enable sweat to move quickly away from a user's skin. The key aspects of human body to maintain the comfort temperature are through moisture vapor by sweating. Sweating is the body's mechanism of keeping us cool. Good wicking effect may enable the user to remain dry and cool so as providing increased comfort. The good wicking effect may also provide the sweat/water with more surface area to evaporate from. Said in another way, as the sweat/water is dispersed over a greater area it may evaporate more rapidly than when the water is pooled together over a small surface area.

Further, good moisture permeability may enable moisture to leave a user's skin and enable natural moisture vapor to bring heat away from the user's skin. The wicking properties may enhance the properties of the coated viscoelastic polyurethane foam.

For example, the viscoelastic polyurethane foam may exhibit a visually observable wicking height (e.g., on a sample of the viscoelastic polyurethane foam having the dimensions of 1.0 inch×0.5 inch×2.0 inch, when an edge of the sample is submersed in 5.0 mm of dyed water) that is greater than a visually observable wicking height of a sample of a different viscoelastic polyurethane foam (which sample has the same dimensions) that is prepared using the same isocyanate-component, the same calculated total water content, and the same isocyanate-reactive component, except that the preformed aqueous polymer dispersion is excluded. For example, the wicking height may be greater by a factor of at least 3 (e.g., may be 3 to 10 times greater and/or 3.5 to 5.5 times greater). Due to the wicking properties, the coating solution may more easily be wicked into the foam, thus taking less total time for all the solution to flatten out into a uniform coating layer thereon The viscoelastic polyurethane foam may exhibit a visually observed wicking time (using a sample of the viscoelastic polyurethane foam), when three drops of dyed water are placed on a surface of the sample, that is less than a visually observed wicking time using a sample of a different viscoelastic polyurethane foam that is prepared using the same isocyanate-component, the same calculated total water content, and the same isocyanate-reactive component, except that the preformed aqueous polymer dispersion is excluded. As would be understanding, the compared samples may have a same thickness/depth, but the length and width of the samples are not dependent on the results. The wicking time is visually observed as the time at which it takes for three drops of dyed water to disappear (i.e., be absorbed by the foam) away from the surface of the samples. The wicking time may be decreased by at least 30 seconds so as to be significantly quicker when the preformed aqueous polymer dispersion is used. For example, the wicking time may be less than 5 seconds for the polyurethane foam prepared using the preformed aqueous polymer dispersion (e.g., greater than half a second).

The viscoelastic polyurethane foam may exhibit improved water vapor permeability, e.g., as measured according to ASTM E96/E96M (and optionally in view of ASTM E2321-03). For example, the water vapor permeability may be improved by at least 5% (e.g., from 5% to 20%) for the polyurethane foam prepared using the preformed aqueous polymer dispersion.

The viscoelastic polyurethane foam may exhibit a Shore 00 hardness, e.g., used for soft elastomeric materials and textiles, may be 30 or less and/or may be greater than 3 (e.g., greater than 5, greater than 8, from 5 to 30, etc.).

As would be understood by a person of ordinary skill in the art, the above comparison of two different foams refers to foams prepared using the same process conditions, same equipment, and the same formulations, except for the exclusion of the preformed aqueous polymer dispersion and/or preformed aqueous polymer dispersant and the increased water content so as to account for excluding the preformed aqueous polymer dispersion in the comparative example.

Coating Material

The coating material includes a phase change material (PCM) coating with an aqueous composition (such as a latex binder) such that the coating is capable of penetrating the foam material. In contrast, a highly viscus coating composition (such as the phase change material without the aqueous composition) may substantially reduce the breathability (as measured according to ASTM D-3574 air flow test) of the foam as it will form a thick coating on top of the foam. Further, the use of highly water wicking polyurethane foam forming compositions may be beneficial in obtaining a breathable as is the combined use of such foams with the phase change material based coated, e.g., for use in bedding mattresses and mattress top layers ("toppers").

In exemplary embodiments, the coating material may include from 5 wt % to 95 wt % (e.g., 10 wt % to 90 wt %, 20 wt % to 70 wt %, 20 wt % to 50 wt %, 20 wt % to 40 wt %, etc.) of one or more PCMs, based on a total weight of the components for forming the coating material (i.e., total weight of coating solution). In exemplary embodiments, the coating material may include from 5 wt % to 95 wt % (e.g., 10 wt % to 90 wt %, 10 wt % to 50 wt %, 10 wt % to 30 wt %, 10 wt % to 25 wt %, 20 wt % to 90 wt %, 30 wt % to 80 wt %, 40 wt % to 80 wt %, 50 wt % to 70 wt %, etc.) of one or more aqueous polymer emulsions, based on the total weight of the coating material. The amount of the one or more aqueous polymer emulsions used may depend on the amount of other additives used in the coating material.

In exemplary embodiments, with respect to additives, the coating material may include from 0 wt % to 30 wt % (e.g., 1 wt % to 20 wt %, 3 wt % to 15 wt %, 5 wt % to 10 wt %, etc.) of one or more surfactants (optional component), based on a total weight of the coating solution. The surfactant may be a silicone surfactant. The coating material may include from 0 wt % to 30 wt % (1 wt % to 20 wt %, 1 wt % to 10 wt %, 1 wt % to 5 wt %, 1 wt % to 3 wt %, etc.), based on a total weight of the coating solution, of one or more silicas. The silica may be fumed silica.

The coating material may include from 0 wt % to 90 wt % (e.g, 1 wt % to 80 wt %, 10 wt % to 70 wt %, 20 wt % to 70 wt %, 30 wt % to 70 wt %, 40 wt % to 60 wt %, 45 wt % to 55 wt %, etc.), based on a total weight of the coating solution, of water. The surfactant and/or silica may be pre-blended in water, e.g., such that the weight of the surfactant/silica may include from 5 wt % to 90 wt % (e.g., from 20 wt % to 80 wt %, 20 wt % to 70 wt %, 30 wt % to 60 wt %, 45 wt % to 55 wt %, etc.) of water.

The coating material may include from 0 wt % to 30 wt % (1 wt % to 20 wt %, 1 wt % to 10 wt %, 1 wt % to 5 wt %, 1 wt % to 3 wt %, etc.), based on a total weight of the coating solution, of an rheology modifier. For example, the rheology modifier may be an ethylene oxide urethane, propylene oxide urethane, and/or butylene oxide urethane based material.

The coating material may include from 0 wt % to 30 wt % (5 wt % to 30 wt %, 10 wt % to 25 wt %, 10 wt % to 20 wt %, etc.), based on a total weight of the coating solution, of a glycol. For example, the glycol may have a number average molecular weight from 150 to 1000 g/mol (e.g., 150 g/mol to 800 g/mol, 150 g/mol to 600 g/mol, 200 g/mol to 500 g/mol, 300 g/mol to 500 g/mol, etc.) The glycol may be a polyethylene glycol or polypropylene glycol.

The phase change material is a substance with a high heat of fusion which, melting and solidifying at a certain temperature, is capable of storing and releasing large amounts of energy. A PCM's latent heat storage may be achieved through liquid-solid, solid-liquid, solid-gas, and/or liquid-gas phase change. In exemplary embodiments, the phase change material in the coating material is used for solid-liquid change. The coating material may include an organic PCM and/or an inorganic PCM. In exemplary embodiments, the PCM may be encapsulated, such that the PCM material may be subject to phase change within an enclosed area after the coating material is applied to the foam. For example, the encapsulated PCM may include a core material, which includes one or more PCMs and an outer shell or capsule wall. The capsule wall contains the PCM, so regardless of whether the PCM is in the liquid or solid state, the capsule itself may remain as a solid particle or gel particle containing (e.g., completely enclosing) the core material. The capsule wall may include an inert polymer. Encapsulation (e.g., microencapsulation) of the PCM may be achieved by methods such as spray drying, centrifugal, and fluidized beds. Exemplary methods for encapsulation are discussed in, e.g. International Publication No. WO 2010/042566.

The capsule wall may be formed of, e.g., a polyacrylate, gelatin, polyurethane, polyurea, urea-formaldehyde, urea-resorcinol-formaldehyde, and/or melamine formaldehyde. The capsule wall may be formed around the one or more PCMs before forming the coating material, i.e., the coating material includes a preformed encapsulated PCM. The encapsulated PCM may have a total PCM content (including one or more PCMs) from 50 wt % to 99 wt % (e.g., 60 wt % to 99 wt %, 70 wt % to 99 wt %, 80 wt % to 98 wt %, and/or 85 wt % to 95 wt %), based on a total weight of the encapsulated PCM. The encapsulated PCM may have a mean particle size from 5 microns to 100 micros micron for dry powder. The encapsulated PCM in wet cake form may have a mean particle size from 1 micron to 20 micron. For example, encapsulated PCMs (e.g., in the form of microcapsules) are available from Microtek Laboratories, Inc. under their Nextek®, Microtek® and Micronal® lines of products, and Encapsys LLC under their EnFinit™ line of products.

The core material, i.e., PCM, may be selected from materials that are most encountered by the human body. For example, the core material (which may include one or more PCMs) may have a melting temperature from 0 to 50° C. and/or from 10 to 40° C. The PCM may be a paraffin-wax or a fatty acid ester, which absorbs and releases heat in order to maintain a particular temperature. For example, the PCM may be a paraffin (e.g., linear paraffin) that includes from 14 to 28 Carbon atoms and/or from 16 to 21 Carbon atoms. The PCM may be a fatty acid or fatty acid ester, either of which can be saturated or unsaturated. The PCM may be a caprilic acid, camphenilone, glycerin, lactic acid, methyl palmitate, or polyethylene oxide derivatives (including polyethylene glycol such as ones with 600 to 1000 g/mol number average molecular weight), selected from ones that have melting points in the range relevant for the human body (e.g., 0 to 50° C. and/or from 10 to 40° C.). The PCM may be inorganic salts, particularly salt hydrates, e.g., $NaCl \cdot Na_2SO_4 \cdot 10H_2O$, $Na_2SO_4 \cdot 10H_2O$, and others.

The encapsulated PCM (e.g., the preformed encapsulated PCM) may be added to the aqueous composition to form the coating material. The aqueous composition may be an aqueous emulsion polymer, e.g., the aqueous composition includes water and at least one emulsion polymer. The aqueous emulsion polymer may be preformed, formed in the presence of the preformed encapsulated PCM, and/or formed in the presence of the materials for forming the encapsulated PCM.

Exemplary aqueous compositions include: PRIMAL™ brand emulsions available from The Dow Chemical Company, RHOPLEX™ brand acrylic emulsions available from The Dow Chemical Company, and HYDRHOLAC™ brand aqueous dispersion polymers available from The Dow Chemical Company. Water may account for 10 wt % to 99 wt % of a total weight of the aqueous composition. Known techniques may be used for preparation of the aqueous emulsion polymer and examples include emulsion polymerization that starts with an emulsion incorporating water, polymer (such as monomer), and optionally a surfactant. Exemplary, aqueous coating compositions are discussed in European Patent No. EP 1 422 276 B1 (also available as U.S. Patent Publication No. 2004/0102568), which is incorporated herein by reference.

In exemplary embodiments, the aqueous composition includes (or consists essentially of) an aqueous acrylic emulsion polymer containing, as copolymerized units, from 50% to 99.75% by weight, based on dry polymer weight, monoethylenically-unsaturated nonionic (meth)acrylic monomer including esters, amides, and nitriles of (meth) acrylic acid, such as, e.g., (meth)acrylic ester monomer including methyl acrylate, ethyl acrylate, butyl acrylate, 2-ethylhexyl acrylate, decyl acrylate, lauryl acrylate, stearyl acrylate, methyl methacrylate, butyl methacrylate, hydroxyethyl methacrylate, hydroxypropyl methacrylate; urieido (meth)acrylate; (meth)acrylonitrile and (meth)acrylamide. The use of the term "(meth)" followed by another term such as acrylate, acrylonitrile, or acrylamide, as used throughout the disclosure, refers to both acrylate, acrylonitrile, or acrylamide and methacrylate, methacrylonitrile, and methacrylamide, respectively. By "nonionic monomer" herein is meant that the copolymerized monomer residue does not bear an ionic charge between pH=1-14.

For example, the aqueous composition includes (or consists essential of) of an aqueous emulsion polymer containing, as copolymerized units, from 0.25% to 10% by weight, based on dry polymer weight, monoethylenically-unsaturated acid monomer such as, for example, acrylic acid, methacrylic acid, crotonic acid, itaconic acid, sulfoethyl methacrylate, phosphoethyl monobutyl methacrylate, fumaric acid, maleic acid, monomethyl itaconate, monomethyl fumarate, fumarate, and maleic anhydride. Preferably, the emulsion polymer contains, as copolymerized units, from 0.3% to 2.5% by weight, based on dry polymer weight, (meth)acrylic acid.

For example, the aqueous composition includes (or consists essential of) of an aqueous emulsion polymer containing, as copolymerized units, from 0 to 60% by weight, based on dry polymer weight, of optional monomers which are neither nonionic monoethylenically-unsaturated nonionic (meth)acrylic monomers nor monoethylenically-unsaturated acid monomers. Optional monomers include, for example, styrene or alkyl-substituted styrenes; butadiene; aminoalkyl (meth)acrylate, N-alkyl aminoalkyl(meth)acrylate, N,N-dialkyl aminoalkyl(meth)acrylate; vinyl acetate, vinyl propionate, or other vinyl esters; vinyl monomers such as vinyl chloride, vinylidene chloride, and N-vinyl pyrollidone; allyl methacrylate, vinyl toluene, vinyl benzophenone, diallyl phthalate, 1,3-butylene glycol dimethacrylate, 1,6-hexanedioldiacrylate, and divinyl benzene.

The emulsion polymer of the aqueous emulsion polymer may substantially uncrosslinked, when it is applied to the foam as the coating material, although low levels of deliberate or adventitious crosslinking can be present. When low levels of precrosslinking or gel content are desired low levels of optional nonionic multi-ethylenically unsaturated monomers such as, e.g., 0.1%-5%, by weight based on the dry polymer weight, can be used. It is important, however, that the quality of the film formation is not materially impaired.

Exemplary surfactants may be used in the aqueous emulsion polymer, such as e.g. anionic and/or nonionic emulsifiers such as, e.g., alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. Polymerizable surfactants can also be used. Preferred polymerizable surfactant monomers are nonylphenoxy propenyl polyethoxylated sulphate (for example as Hitenol from Dai-ichi Corp); sodium alkyl allyl sulphosuccinate (for example as Trem LF-40 from Henkel Corp); ammonium di-(tricyclo(5.2.1.0 2,6)dec-3-en-(8 or 9)oxyethyl)sulfosuccinate; and ammonium di-(tricyclo(5.2.1.0 2,6) dec-3-en-(8 or 9) sulfosuccinate. Additionally, the ammonium and metal salts of unsaturated C6 to C30 organic acids can be used, alone or in combination with the above surfactants. Examples of these acids are: alpha methyl cinnamic acid, alpha phenyl cinnamic acid, oleic acid, lineolic acid (as described in U.S. Pat. No. 5,362,832), rincinoleic acid, the unsaturated fraction of Tall oil rosin and fatty acids, disproportionated rosin acid, soybean oil fatty acids, olive oil fatty acids, sunflower oil fatty acids, linseed oil fatty acids, safflower oil fatty acids, sorbitan mono-oleate, abietic acid, poly(oxyethylene) sorbitol sesquioleate, and Empol 1010 Dimer Acid. Suitable polymerizable surfactant monomers also include, for example, maleate derivatives (as described in U.S. Pat. No. 4,246,387), and allyl derivatives of alkyl phenol ethoxylates (as described in JP-62227435). The amount of surfactant used may be from from 0.1% to 25% by weight, based on the total weight of polymer. The surfactant may be pre-blended with water.

A low VOC content coating may be sought for use with foams the low VOC coating composition can contain coalescing agents which are not VOCs. A coalescing agent is a compound that is added to a water-borne emulsion polymer, paint or coating and which reduces the minimum film forming temperature (MFFT) of the emulsion polymer, paint or coating by at least 1° C. The MFFT is measured using ASTM test method D2354. Examples of a coalescing aid which is not a VOC include a plasticizer, low molecular weight polymer, and surfactants. That is, a non-VOC coalescing agent is a coalescing agent which has a boiling point above 280° C. at atmospheric pressure.

Typical methods of paint or coating preparation can introduce adventitious VOCs from the emulsion polymer, biocides, defoamers, soaps, dispersants, and thickeners. These typically account for 0.1% VOC by weight based on the total weight of the coating composition. Additional methods such as steam stripping and choice of low VOC containing additives like biocides, defoamers, soaps, dispersants, and thickeners, can be used to further reduce the paint or coating to less than 0.01% VOC by weight based on the total weight of the coating composition.

The coating material may be applied to a foam that has a straight, flat surface. The coating material may also be applied to curved surfaces, (e.g., contour-cut pillows), more complicated topology surfaces (e.g., the so-called "egg crate" foam pads, also known as convoluted foam sheets; another example is a wavy pattern) that are known in the foam and mattress industry. The coating material may be applied directly on a foam surface, e.g., may be spray coated and/or poured onto the foam surface. The coating material may be allowed to spread on its own or the spreading may be assisted with the use of tools such as a wooden or metal stick or rod, or with the use of an air knife. Curtain coating instruments may be used as well, and the foam can be moved, with the assistance of a conveyor belt, through the curtain of coating liquid. Roll-to-roll coatings of various types can be used as well.

All parts and percentages are by weight unless otherwise indicated. All molecular weight data is based on number average molecular weight, unless indicated otherwise.

EXAMPLES

Two types of foams may be prepared as discussed below. The first set of foam samples are prepared using the preformed aqueous polymer dispersion, but examples may be prepared using both the preformed aqueous polymer dispersion and the preformed aqueous polymer dispersant. The second set of foam samples are prepared using the preformed aqueous polymer dispersant, but examples may be prepared using both the preformed aqueous polymer dispersion and the preformed aqueous polymer dispersant.
First Set Foam Samples The data and descriptive information provided herein are based on approximations. Further, the materials principally used are as the following:

AD 1 An aqueous acid polymer dispersion including approximately 21.7 wt % of a potassium hydroxide neutralized ethylene-acrylic acid copolymer salt and 78.3 wt % of water, made using a twin screw extruder and a dilution scheme as described in U.S. Pat. No. 8,318,257, is prepared as follows:

A first feed includes 100 wt % of PRIMACOR™ 5986 (an ethylene acrylic acid resin having approximately 20.5 wt % of acrylic acid) at a flow rate of 234 lb/h, a second feed includes 100 wt % of potassium hydroxide (solution in water with approximately 45 wt % KOH) at a flow rate of 125 lb/h, and a third feed includes 100 wt % of water at a flow rate of 50 lb/h. A first dilution pump feeds water at 220 lb/h and a second dilution pump at 538 lb/h to achieve the desired solids content. The barrel/zone temperature control conditions are the following:

TABLE 1

| Zone Number | Temperature ° C. |
|---|---|
| Zone 1 | 27 |
| Zone 2 | 151 |
| Zone 3 | 147 |
| Zone 4 | 148 |
| Zone 5 | 161 |
| Zone 6 | 149 |
| Zone 7 | 107 |
| Zone 8 | 109 |
| Zone 9 | 80 |
| Zone 10 | 131 |
| Zone 11 | 72 |
| Zone 12 | 72 |

AD 2 An aqueous acid polymer dispersion of approximately 32.3 wt % of an ammonium hydroxide neutralized ethylene acrylic acid copolymer salt and 67.7 wt % of water, prepared similar to as AD 1 except, the second feed is different and the dilution scheme is varied to achieve the desired higher solids content, as would be understood by one of ordinary skill in the art.

AD 3 An aqueous dispersion of an aqueous acid-modified ethylene based copolymer, at a solids content from 40.5 wt % to 43.5 wt %, based on the total weight of the aqueous dispersion (available as HYPOD™ 8503 from The Dow Chemical Company and enabled with BLUE-WAVE™ Technology).

AD 4 An aqueous dispersion of an aqueous acid-modified polyolefin polymer, at a solids content from 54 wt % to 58 wt %, based on the total weight of the aqueous dispersion (available as HYPOD™ XU-36534 from The Dow Chemical Company and enabled with BLUE-WAVE™ Technology).

Polyol 1 A polyoxypropylene polyether polyol, having a nominal hydroxyl functionality of 3 and a number average molecular weight of approximately 1000 g/mol (available as VORANOL™ 3150 and VORANOL™ 8150, differing by catalyst used, from The Dow Chemical Company).

Polyol 2 A glycerine initiated polyoxyethylene-polyoxypropylene polyether polyol, having an ethylene oxide content of approximately 60 wt %, a nominal hydroxyl functionality of 3, primary hydroxyl content of approximately 35%, and a number average molecular weight of approximately 1000 g/mol.

Polyol 3 An polyoxypropylene-polyoxyethylene polyether polyol initiated with glycerine, having an ethylene oxide content of less than 20 wt %, a nominal hydroxyl functionality of 3, and a number average molecular weight of approximately 3100 g/mol (available as VORANOL™ 3136 and VORANOL™ 8136, differing by catalyst used, from The Dow Chemical Company).

Isocyanate 1 A polymeric methylene diphenyl diisocyanate—PMDI (available as PAPI™ 94 from The Dow Chemical Company).

Isocyanate 2 A polymeric methylene diphenyl diisocyanate—PMDI (available as PAPI™ 23 from The Dow Chemical Company).

Surfactant An organosilicone surfactant (available as Niax™ L-618 from Momentive Performance Materials).

Amine 1 A tertiary amine catalyst (available Dabco® BL-11 from Air Products).

Amine 2 A tertiary amine catalyst (available as Dabco® 33-LV from Air Products).

Tin A tin catalyst (available as KOSMOS® 29 from Evonik Industries).

DI Deionized Water.

Working Examples 1 to 3 and Comparative Examples A and B are prepared according to the approximate formulations in Table 2, below. In the Examples below, the total formulation mass is set to be 1900 grams. Working Examples 1 to 3 are prepared using one of AD 1 and AD 2, which are preformed aqueous acid dispersions. Comparative Example A is prepared using only water, i.e., not using a dispersion. Comparative Example B is an attempt at preparing a viscoelastic foam using ethylene-acrylic acid copolymer and water that are added separately, i.e., not using a preformed dispersion. However, due to the inability of ethylene-acrylic acid copolymer to dissolve in water at ambient conditions (it is believed, without intending to be bound by this theory, that a temperature of at least approximately 120° C. would be needed to melt the ethylene-acrylic acid copolymer crystals in water) such a mixture would be non-preferred and/or unsuitable for use in a foaming reaction for forming a viscoelastic foam. In other words, it is believed, the high temperature required to obtain solubility would be non-preferred and/or unsuitable for the purpose herein and/or non-dissolved ethylene-acrylic acid copolymer crystals would be non-preferred and/or unsuitable for the purpose herein. The density of the samples range from approximately 2.7 to 3.0 lb/ft³ (according to ASTM D 3574 Test G).

TABLE 2

|  | Ex. 1 | Ex. 2 | Ex. 3 | Ex. A | Ex. B |
|---|---|---|---|---|---|
| Isocyanate-Reactive Component (amount based on parts by weight) | | | | | |
| AD 1 | 1.40 | 1.40 | — | — | — |
| AD 2 | — | — | 1.62 | — | — |
| PRIMACOR ™ 5986 | — | — | — | — | 1.40 |
| DI | 1.10 | 1.10 | 1.10 | 2.20 | 2.20 |
| Polyol 1 | 20.00 | 20.00 | 20.00 | 20.00 | 20.00 |
| Polyol 2 | 60.00 | 60.00 | 60.00 | 60.00 | 60.00 |
| Polyol 3 | 20.00 | 20.00 | 20.00 | 20.00 | 20.00 |
| Surfactant | 0.80 | 0.80 | 0.80 | 0.80 | 0.80 |
| Amine 1 | 0.15 | 0.15 | 0.15 | 0.15 | 0.15 |
| Amine 2 | 0.05 | 0.05 | 0.05 | 0.05 | 0.05 |
| Tin | 0.05 | 0.05 | 0.05 | 0.05 | 0.05 |
| Isocyanate Component (amount based on parts by weight) | | | | | |
| Isocyanate 1 | 53.35 | 52.01 | 53.35 | 53.35 | 53.35 |
| Composition Properties | | | | | |
| Approximate Total Parts | 156 | 156 | 157 | 156 | 156 |
| Index | 80 | 78 | 80 | 80 | 80 |
| AD wt % in Isocyanate-Reactive Component | 1.35 | 1.35 | 1.56 | — | — |

TABLE 2-continued

|  | Ex. 1 | Ex. 2 | Ex. 3 | Ex. A | Ex. B |
|---|---|---|---|---|---|
| Calculated Total Water Content (parts by weight) | 2.20 | 2.20 | 2.20 | 2.20 | 2.20 |
| Foam Properties | | | | | |
| Air Flow (scfm) | 8.5 | 8.4 | 7.9 | 3.4 | * |
| Average Resiliency (%) | 5.2 | — | 4 | 4 | * |
| Recovery Time (seconds) | 3 | 5 | 3 | 3 | * |
| IFD @ 25% Deflection (lb) | 8.2 | 9.9 | 7.8 | 14.0 | * |
| IFD @ 65% Deflection (lb) | 17.6 | 21.1 | 16.1 | 28.3 | * |
| IFD @ 25% Return (lb) | 7.1 | 8.3 | 6.9 | 12.5 | * |

*Unable to form a viscoelastic foam because the PRIMACOR ™ 5986 did not dissolve in water at ambient conditions Working Examples 4 to 11 and Comparative Example C are prepared according to the approximate formulations in Table 3, below. In the Examples below, the total formulation mass is set to be 1900 grams. Working Examples 4 to 11 are prepared using one of AD 3 and AD 4, which are preformed aqueous acid-modified polyolefin dispersion. Comparative Example C is prepared using only water, i.e., not using a dispersion. The density of the samples range from approximately 2.5 to 3.0 lb/ft$^3$ (according to ASTM D3574 Test G).

TABLE 3

|  | Ex. 4 | Ex. 5 | Ex. 6 | Ex. 7 | Ex. 8 | Ex. 9 | Ex. 10 | Ex. 11 | Ex. 12 | Ex. C |
|---|---|---|---|---|---|---|---|---|---|---|
| Isocyanate-Reactive Component (amount based on parts by weight) | | | | | | | | | | |
| AD 3 | 2.20 | 0.77 | 0.77 | 1.91 | — | — | — | — | 1.91 | — |
| AD 4 | — | — | — | — | 0.51 | 1.01 | 1.52 | 2.53 | — | — |
| DI | 1.10 | 1.98 | 1.76 | 1.10 | 1.98 | 1.76 | 1.54 | 1.10 | 1.10 | 2.20 |
| Polyol 1 | 15.00 | 15.00 | 15.00 | 15.00 | 15.00 | 15.00 | 15.00 | 15.00 | 20.00 | 15.00 |
| Polyol 2 | 60.00 | 60.00 | 60.00 | 60.00 | 60.00 | 60.00 | 60.00 | 60.00 | 60.00 | 60.00 |
| Polyol 3 | 25.00 | 25.00 | 25.00 | 25.00 | 25.00 | 25.00 | 25.00 | 25.00 | 20.00 | 25.00 |
| Surfactant | 0.80 | 0.80 | 0.80 | 0.80 | 0.80 | 0.80 | 0.80 | 0.80 | 0.80 | 0.80 |
| Amine 1 | 0.15 | 0.15 | 0.15 | 0.15 | 0.15 | 0.15 | 0.15 | 0.15 | 0.15 | 0.15 |
| Amine 2 | 0.05 | 0.05 | 0.05 | 0.05 | 0.05 | 0.05 | 0.05 | 0.05 | 0.05 | 0.05 |
| Tin | 0.05 | 0.05 | 0.05 | 0.05 | 0.05 | 0.05 | 0.05 | 0.05 | 0.05 | 0.05 |
| Isocyanate Component (amount based on parts by weight) | | | | | | | | | | |
| Isocyanate 1 | 51.00 | 50.99 | 50.99 | 50.99 | 50.99 | 50.99 | 50.99 | 50.99 | 51.48 | 50.99 |
| Composition Properties | | | | | | | | | | |
| Approximate Total Parts | 155 | 154 | 155 | 155 | 155 | 155 | 155 | 155 | 156 | 154 |
| Index | 75 | 78 | 78 | 78 | 78 | 78 | 78 | 78 | 77 | 78 |
| AD wt % in Isocyanate-Reactive Component | 2.11 | 0.74 | 0.74 | 1.84 | 0.50 | 0.97 | 1.46 | 2.42 | 1.84 | — |
| Calculated Total Water Content (parts by weight total) | 2.37 | 2.20 | 2.20 | 2.20 | 2.20 | 2.20 | 2.20 | 2.20 | 2.20 | 2.20 |
| Foam Properties | | | | | | | | | | |
| Air Flow (scfm) | 8.9 | 5.6 | 6.2 | 9.7 | 5.4 | 6.1 | 7.3 | 9.6 | 7.3 | 4.1 |
| Average Resiliency (%) | 6 | 4 | 4 | 5 | 3 | 4 | 4 | 4 | 5 | 3 |
| Recovery Time (seconds) | 7 | 3 | 3 | 5 | 3 | 4 | 4 | 4 | 2 | 3 |
| IFD @ 25% Deflection (lb) | 5.2 | 8.4 | 8.3 | 5.9 | 8.8 | 8.8 | 7.9 | 5.8 | 11.4 | 10.7 |
| IFD @ 65% Deflection (lb) | 11.6 | 18.6 | 18.4 | 13.2 | 19.1 | 19.2 | 17.3 | 13.2 | 25.9 | 22.6 |

TABLE 3-continued

| | Ex. 4 | Ex. 5 | Ex. 6 | Ex. 7 | Ex. 8 | Ex. 9 | Ex. 10 | Ex. 11 | Ex. 12 | Ex. C |
|---|---|---|---|---|---|---|---|---|---|---|
| IFD @ 25% Return (lb) | 4.2 | 7.3 | 7.2 | 4.9 | 7.8 | 7.5 | 6.7 | 5.0 | 10.2 | 9.4 |

For each of Working Examples 1 to 11 and Comparative Examples A to C, foam samples are prepared by box foaming at ambient conditions, under a fume hood using a 38 cm×38 cm×24 cm (15"×15"×9.5") wooden box lined with clear plastic film. A 16-pin (4 pins each in four radial directions that are separated by 90°) mixer at high rotation speed is used at high rotation speed setting, together with a 1 gallon cup (16.5 cm diameter, 18 cm tall). The components in the Isocyanate-Reactive Component, with the exception of the Tin catalyst, are mixed first for 15 seconds at 2400 rpm. Then, the Tin catalyst is added and immediately mixed for another 15 seconds at 2400 rpm. Next, the Isocyanate Component is added and immediately mixed for another 3 seconds at 3000 rpm. Then, the mixed Isocyanate-Reactive Component and Isocyanate Component is poured into the box lined with plastic film. The foam is observed as having reached maximum height when bubbles appear at the top surface of the foam. Once foaming is complete, the foam is further allowed to cure overnight under the fume hood. Foam sample walls are discarded, and the remaining samples are characterized.

For Working Example 12, the foam is made using a Cannon Varimax foaming machine. The Polyol 1 and Polyol 3 are used as a blend with a ratio of 1:1. The total polyol flow rate targets 110 lb/min. A foam bun is made with the size of approximately 96 inch×52 inch×20 inch. The resultant foam sample is cut a day after the foam is fabricated. Then, the samples are conditioned for 24 hours before the physical property tests are performed.

Calculated Total Water Content (parts by weight) is calculated as the total amount of DI (deionized water) added to the formulation plus the amount of water added to the formulation as part of the aqueous dispersion.

Air flow is a measure of the air that is able to pass through the foam under a given applied air pressure. Air flow is measured as the volume of air which passes through a 1.0 inch (2.54 cm) thick×2 inch×2 inch (5.08 cm) square section of foam at 125 Pa (0.018 psi) of pressure. Units are expressed in standard cubic feet per minute (scfm). A representative commercial unit for measuring air flow is manufactured by TexTest AG of Zurich, Switzerland and identified as TexTest Fx3300. Herein, air flow is measured according to ASTM D3574 Test G.

Average resiliency is measured according to ASTM D3574 Test H, in particular using the ball rebound test. Recovery time is measured on a 4 inches by 4 inches by 2 inches foam piece by releasing/returning the compression load head from a 75% position (i.e., the foam sample is compressed to 100% minus 75% of the sample's original thickness) to the position where foam compression is to a 10% position (based on the original thickness of the foam sample). The Recovery Time is defined as the time from the releasing/returning the compression load head to the moment that the foam pushes back against the load head with a force of at least 1 newton.

IFD is referred to as indentation force deflection and it is measured according to ASTM D3574 Test $B_1$. IFD is defined as the amount of force in pounds required to indent a fifty square inch circular plate sample a certain percentage of the sample's original thickness. Herein, IFD is specified as the number of pounds at 25% deflection and at 65% deflection for the foam sample. Lower IFD values are sought for viscoelastic foams. For example, an IFD at 25% from 6 to 12 may be used for bed pillows, thick back pillows, etc. An IFD at 25% from 12 to 18 may be used for medium thickness back pillows, upholstery padding, etc. An IFD at 25% from 18 to 24 may be used for thin back pillows, tufting matrix, very thick seat cushions, etc. An IFD at 25% greater than 24 may be used for average to firmer seat cushions, firm mattresses, shock absorbing foams, packaging foams, carpet pads, and other uses requiring ultra-firm foams.

IFD at 25% Return is the ability of the foam to recover. In particular, the IFD at 25% Return is measured as the percentage of the IFD at 25% that is recovered after cycling through the IFD at 65% measurement and returning to 25% compression.

As used herein, the term "tear strength" is used herein to refer to the maximum average force required to tear a foam sample which is pre-notched with a slit cut lengthwise into the foam sample. The test results are determined according to the procedures of ASTM D3574 Test F in pound-force per linear inch (lb_f/in) or in Newtons per meter (N/m).

Wicking Effect and Moisture/Heat Management

Working Example 12 is further evaluated for wicking and moisture/heat management, as combined with the high air-flow. To test the wicking wetting effect, Comparative Example D is prepared using the same method and formulation as Working Example 12, except Additive 3 is not added to the formulation.

To realize a good wicking effect, the materials should have a good wetting effect. To perform the wetting effect, three drops of dyed water are put on the surface of the respective foam samples having a thickness of 1.0 inch and the time at which it takes for the drops of water to disappear from the surface is visually observed and recorded as the wicking time. Each droplet of water is approximately 42 milligrams. The water is dyed with an orange dye available from Milliken Chemical. Working Example 12 is visually observed to have a faster wicking speed and the water drops are wicked away from the surface of the sample at a wicking time of approximately 1 second and Comparative Example D is visually observed to have a slower wicking speed with a wicking time of 38 seconds. Accordingly, it is seen that when the foam samples for are made using the same conditions and formulations, except that the preformed aqueous polymer dispersion is excluded in the comparative example, that the wicking speed is quicker and the wicking time is lower by approximately 37 seconds, when the preformed aqueous polymer dispersion is included.

Wicking height may also be testing using a vertical wicking test. In particular, foam samples having the dimensions of 1.0 inch×0.5 inch×2.0 inch are prepared for Working Example 12 and Comparative Example D. The tips of the foam samples are immersed in 5.0 mm of the dyed water, while the foam samples are maintain in a substantially vertical position relative to the horizontal dish holding the dyed water. Vertical wicking, i.e., upward movement, of the water is enabled for 1 minute (at ambient conditions). Then, the upward movement is measured using a ruler and recorded as the vertical wicking height. Working Example 12 is measured as having a vertical wicking height of 6.35 mm and Comparative Example D is measured as having a vertical wicking height of 1.59 mm. Accordingly, it is seen that when the foam samples are made using the same conditions and formulations, except that the preformed aqueous polymer dispersion is excluded in the comparative example, that the wicking height is increased by a factor of approximately 4 when the preformed aqueous polymer dispersion is included.

The water vapor permeability of Working Example 12 and Comparative Example D may be testing. In particular, a standard cup desiccant method is conducted following ASTM E96/E96M. Further, ASTM E2321-03 is followed for the Standard Practice, a petri dish method (the diameter of the petri dish is 5.5 inch). For testing each of Working Example 12 and Comparative Example D, three specimens are used, of which specimens are foam samples that have a thickness of approximately 1.30 inches and that have their edges sealed with wax (e.g., wax that is melted at approximately 140° F.). To test the water vapor permeability, the petri dish is filled up to within ¼ in of the top rim. During testing the humidity level is 72.7% and the temperature control is 50.8° F.

Working Example 12 is observed as having a water vapor permeability of approximately 71.6 (grains/hour/ft$^2$)/ΔP× inches and Comparative Example D is observed as having a significantly lower water vapor permeability of approximately 67.4 (grains/hour/ft$^2$)/ΔP×inches. Accordingly, it is seen that when the foam samples are made using the same conditions and formulations, except that the preformed aqueous polymer dispersion is excluded in the comparative example, that the water vapor permeability may be improved by approximately 5.9% when the preformed aqueous polymer dispersion is included.

Second Set Foam Samples

The data and descriptive information provided herein are based on approximations. Further, the materials principally used are as the following:

AD 5 A liquid preformed aqueous polymer dispersant that includes 21.0% to 23.0% of proprietary polycarboxylate, ammonium salt and 77.0% to 79.0% of water, and that has a pH from 8.5 to 9.0 and is referred to as a hydrophobic copolymer polyelectrolyte (available as TAMOL™ 165A Dispersant from The Dow Chemical Company).

AD 6 A liquid preformed aqueous polymer dispersant that includes 24.0% to less than or equal to 26.0% of proprietary polycarboxylate, sodium salt and 74.0% to 76.0% of water, and that has a pH from 9.5 to 10.8 and is referred to as a sodium salt of maleic anhydride copolymer (available as TAMOL™ 731A Dispersant from The Dow Chemical Company).

AD 7 A liquid preformed aqueous polymer dispersant that includes greater than or equal to 34.0% to 36.0% of proprietary acrylic polymers, less than or equal to 0.2% of aqua ammonia, greater than or equal to 26.0% to 28.0% propanediol, and greater than or equal to 37.0% to 39.0% of water, and that has a pH from 9.3 to 9.8 and is referred to as a hydrophobic copolymer polyelectrolyte (available as TAMOL™ 681 Dispersant from The Dow Chemical Company).

AD 8 A liquid preformed aqueous polymer dispersant that includes 29.0% to 31.0% of proprietary polycarboxylate, sodium salt and 69.0% to 71.0% of water, and that has a pH from 9.0 to 10.8 and is referred to as an anionic polyelectrolyte (available as TAMOL™ 851 Dispersant from The Dow Chemical Company).

AD 9 A liquid preformed aqueous polymer dispersant that includes 34.0% to 36.0% of proprietary salt of polycarboxylatic acid and 64.0% to 66.0% of water, and that has a pH from 6.5 to 7.5 and is referred to as an anionic polyelectrolyte (available as TAMOL™ 1254 Dispersant from The Dow Chemical Company).

AD 10 A liquid preformed aqueous polymer dispersant that 25.0% to less than or equal to 29.0% of proprietary styrene/acrylic copolymers, less than or equal to 0.25% of aqua ammonia, greater than or equal to 1.0% to less than or equal to 2.0% dipropylene glycol monomethyl ether, and 71.0% to less than or equal to 75.0% of water, and that has a pH from 8.2 to 8.6 and is referred to as an hydrophobic copolymer dispersant (available as OROTAN™ CA-2500 Dispersant from The Dow Chemical Company).

Working Examples 13 to 18 and Comparative Example D are prepared according to the approximate formulations in Table 4, below. In the Examples below, the total formulation mass is set to be 1900 grams. Working Examples 13 to 18 are prepared using one of AD 1, AD 2, AD 3, AD 4, AD 5, and AD 6, respectively, which are preformed aqueous polymer dispersants. Comparative Example D is prepared using only water, i.e., not using an aqueous polymer dispersant. The density of the samples range from approximately 2.7 to 3.2 lb/ft$^3$ (according to ASTM D3574 Test A).

TABLE 4

| | Ex. 13 | Ex. 14 | Ex. 15 | Ex. 16 | Ex. 17 | Ex. 18 | Ex. D |
|---|---|---|---|---|---|---|---|
| Isocyanate-Reactive Component (amount based on parts by weight) | | | | | | | |
| AD 5 | 1.40 | — | — | — | — | — | — |
| AD 6 | — | 1.40 | — | — | — | — | — |
| AD 7 | — | — | 1.40 | — | — | — | — |
| AD 8 | — | — | — | 1.40 | — | — | — |
| AD 9 | — | — | — | — | 1.40 | — | — |
| AD 10 | — | — | — | — | — | 1.40 | — |
| DI | 1.12 | 1.15 | 1.48 | 1.22 | 1.30 | 1.17 | 2.20 |
| Polyol 1 | 20.00 | 20.00 | 20.00 | 20.00 | 20.00 | 20.00 | 20.00 |
| Polyol 2 | 60.00 | 60.00 | 60.00 | 60.00 | 60.00 | 60.00 | 60.00 |
| Polyol 3 | 20.00 | 20.00 | 20.00 | 20.00 | 20.00 | 20.00 | 20.00 |
| Surfactant | 0.80 | 0.80 | 0.80 | 0.80 | 0.80 | 0.80 | 0.80 |
| Amine 1 | 0.15 | 0.15 | 0.15 | 0.15 | 0.15 | 0.15 | 0.15 |
| Amine 2 | 0.05 | 0.05 | 0.05 | 0.05 | 0.05 | 0.05 | 0.05 |
| Tin | 0.05 | 0.05 | 0.05 | 0.05 | 0.05 | 0.05 | 0.05 |

TABLE 4-continued

| | Ex. 13 | Ex. 14 | Ex. 15 | Ex. 16 | Ex. 17 | Ex. 18 | Ex. D |
|---|---|---|---|---|---|---|---|
| Isocyanate Component (amount based on parts by weight) | | | | | | | |
| Isocyanate 1 | 52.01 | 52.01 | 52.01 | 52.01 | 52.01 | 52.01 | 52.01 |
| Composition Properties | | | | | | | |
| Approximate Total Parts | 156 | 156 | 156 | 156 | 156 | 156 | 155 |
| Index | 78 | 78 | 78 | 78 | 78 | 78 | 78 |
| AD wt % in Isocyanate-Reactive Component | 1.3 | 1.3 | 1.3 | 1.3 | 1.3 | 1.3 | — |
| Calculated Total Water Content (parts by weight) | 2.20 | 2.20 | 2.20 | 2.20 | 2.20 | 2.20 | 2.20 |
| Foam Properties | | | | | | | |
| Air Flow (scfm) | 5.9 | 5.8 | 4.6 | 5.8 | 4.8 | 9.5 | 3.6 |
| Average Resiliency (%) | 4 | 7 | 4 | 4 | 4 | 4 | 3 |
| Tensile Strength (psi) | 10.8 | 14.9 | 10.5 | 9.2 | 9.9 | 10.2 | 8.5 |
| Percent Elongation | 94 | 87 | 92 | 83 | 92 | 90 | 92 |
| Tear Strength (psi) | 1.32 | 1.53 | 1.38 | 1.02 | 1.06 | 1.20 | 1.10 |
| IFD @ 25% Deflection (lb) | 14 | 15 | 19 | 9 | 9 | 12 | 14 |
| IFD @ 65% Deflection (lb) | 28 | 31 | 37 | 19 | 19 | 24 | 27 |
| IFD @ 25% Return (lb) | 12 | 10 | 17 | 8 | 8 | 10 | 13 |

For each of Working Examples 13 to 18 and Comparative Examples D, foam samples are prepared by box foaming at ambient conditions, under a fume hood using a 38 cm×38 cm×24 cm (15"×15"×9.5") wooden box lined with clear plastic film. A 16-pin (4 pins each in four radial directions that are separated by 90°) mixer at high rotation speed is used at high rotation speed setting, together with a 1 gallon cup (16.5 cm diameter, 18 cm tall). The components in the Isocyanate-Reactive Component, with the exception of the Tin catalyst, are mixed first for 15 seconds at 2400 rpm. Then, the Tin catalyst is added and immediately mixed for another 15 seconds at 2400 rpm. Next, the Isocyanate Component is added and immediately mixed for another 3 seconds at 3000 rpm. Then, the mixed Isocyanate-Reactive Component and Isocyanate Component is poured into the box lined with plastic film. The foam is observed as having reached maximum height when bubbles appear at the top surface of the foam. Once foaming is complete, the foam is further allowed to cure overnight under the fume hood. Foam sample walls are discarded, and the remaining samples are characterized.

Calculated Total Water Content (parts by weight) is calculated as the total amount of DI (deionized water) added to the formulation plus the amount of water added to the formulation as part of the aqueous dispersant.

Air flow is a measure of the air that is able to pass through the foam under a given applied air pressure. Air flow is measured as the volume of air which passes through a 1.0 inch (2.54 cm) thick×2 inch×2 inch (5.08 cm) square section of foam at 125 Pa (0.018 psi) of pressure. Units are expressed in standard cubic feet per minute (scfm). A representative commercial unit for measuring air flow is manufactured by TexTest AG of Zurich, Switzerland and identified as TexTest Fx3300. Herein, air flow is measured according to ASTM D3574 Test G.

Average resiliency is measured according to ASTM D3574 Test H, in particular using the ball rebound test. Recovery time is measured is measured by releasing/returning the compression load head from a 75% position (i.e., the foam sample is compressed to 100% minus 75% of the sample's original thickness) to the position where foam compression is to a 10% position (based on the original thickness of the foam sample). The Recovery Time is defined as the time from the releasing/returning the compression load head to the moment that the foam pushes back against the load head with a force of at least 1 newton.

Tensile strength and percent elongation are measured according to ASTM D3574 Test E. As used herein, the term "tear strength" is used herein to refer to the maximum average force required to tear a foam sample which is pre-notched with a slit cut lengthwise into the foam sample. The test results are determined according to the procedures of ASTM D3574 Test F in pound-force per linear inch ($lb_f$/in) or in newtons per meter (N/m).

IFD is referred to as indentation force deflection and it is measured according to ASTM D3574 Test $B_1$. IFD is defined as the amount of force in pounds required to indent sample a certain percentage of the sample's original thickness using a fifty square inch circular plate. Herein, IFD is specified as the number of pounds at 25% deflection and at 65% deflection for the foam sample. Lower IFD values are sought for viscoelastic foams. For example, an IFD at 25% from 6 to 12 may be used for bed pillows, thick back pillows, etc. An IFD at 25% from 12 to 18 may be used for medium thickness back pillows, upholstery padding, etc. An IFD at 25% from 18 to 24 may be used for thin back pillows, tufting matrix, very thick seat cushions, etc. An IFD at 25% greater than 24 may be used for average to firmer seat cushions, firm mattresses, shock absorbing foams, packaging foams, carpet pads, and other uses requiring ultra-firm foams.

IFD at 25% Return is the ability of the foam to recover. In particular, the IFD at 25% Return is measured as the percentage of the IFD at 25% that is recovered after cycling through the IFD at 65% measurement and returning to 25% compression.

Wicking Effect and Moisture/Heat Management

Working Example 12 is further evaluated for wicking and moisture/heat management, as combined with the high air-flow. To test the wicking wetting effect, Comparative Example D is prepared using the same method and formulation as Working Example 12, except Additive 3 is not added to the formulation.

Wicking height may also be testing using a vertical wicking test. In particular, foam samples having the dimensions of 1.0 inch×0.5 inch×2.0 inch are prepared for Working Example 12 and Comparative Example D. The tips of the foam samples are immersed in 5.0 mm of the dyed water, while the foam samples are maintain in a substantially vertical position relative to the horizontal dish holding the dyed water. Vertical wicking, i.e., upward movement, of the water is enabled for 1 minute (at ambient conditions). Then, the upward movement is measured using a ruler and recorded as the vertical wicking height. Working Example 12 is measured as having a vertical wicking height of 6.35 mm and Comparative Example D is measured as having a vertical wicking height of 1.59 mm. Accordingly, it is seen that when the foam samples are made using the same conditions and formulations, except that the preformed aqueous polymer dispersion is excluded in the comparative example, that the wicking height is increased by a factor of approximately 4 when the preformed aqueous polymer dispersion is included.

The water vapor permeability of Working Example 12 and Comparative Example D may be testing. In particular, a standard cup desiccant method is conducted following ASTM E96/E96M. Further, ASTM E2321-03 is followed for the Standard Practice, a petri dish method (the diameter of the petri dish is 5.5 inch). For testing each of Working Example 12 and Comparative Example D, three specimens are used, of which specimens are foam samples that have a thickness of approximately 1.30 inches and that have their edges sealed with wax (e.g., wax that is melted at approximately 140° F.). To test the water vapor permeability, the petri dish is filled up to within ¼ in of the top rim. During testing the humidity level is 72.7% and the temperature control is 50.8° F.

Working Example 12 is observed as having a water vapor permeability of approximately 71.6 (grains/hour/ft$^2$)/ΔP× inches and Comparative Example D is observed as having a significantly lower water vapor permeability of approximately 67.4 (grains/hour/ft$^2$)/ΔP×inches. Accordingly, it is seen that when the foam samples are made using the same conditions and formulations, except that the preformed aqueous polymer dispersion is excluded in the comparative example, that the water vapor permeability may be improved by approximately 5.9% when the preformed aqueous polymer dispersion is included.

First Set Coated Samples

The first set of coating samples uses a viscoelastic foam prepared using additives. The data and descriptive information provided herein are based on approximations. Further, the materials principally used are as the following:

PCM Microencapsulated phase change material (available as MPCM 28D from Microtek Laboratories).

Emulsion A liquid preformed aqueous polymer dispersant that includes 24.0% to less than or equal to 26.0% of proprietary polycarboxylate, sodium salt and 74.0% to 76.0% of water, and that has a pH from 9.5 to 10.8 and is referred to as a sodium salt of maleic anhydride copolymer (available as PRIMAL™ TX 010 from The Dow Chemical Company).

Surfactant Niax™ L-7605 diluted by water at 50% by weight (Niax™ L-7605 is available from Momentive Performance Materials).

Exemplary coating material samples are prepared according to the formulations in Table 5, below.

TABLE 5

| | Coating Material 1 (wt %) | Coating Material 2 (wt %) |
| --- | --- | --- |
| Weight Percentage Total Composition | | |
| PCM | 30.3 | 37.1 |
| Emulsion | 60.6 | 55.5 |
| Surfactant | 9.1 | 7.4 |
| Total Weight of Sample Formed | | |
| Total weight (g) | 99 | 81 |

The Coating Materials 1 and 2 are prepared by weighing out each component into a clean tri-pour beaker (or suitable plastic container). They were hand-mixed using a wooden tongue depressor into a mixture of even consistency was formed. The coating materials can be dispensed onto the foams by directly pouring out from the container.

Exemplary foam samples for use with the coating materials are prepared according to the formulations in Table 6, below. The foam samples are prepared by procedure discussed above. The coated samples are prepared by pouring the indicated Coating Material bit by bit onto one surface of a foam, and cast into a uniform and smooth layer using a wooden tongue depressor, and this was continued until all the solution was poured out. Then the foam is left in the fume hood overnight at room temperature overnight to dry out the water. The total area of the foam coated is controlled at ~70 square inch so that the amount of PCM per unit area is the same. The resulting material after coating is referred to as "coated foam." For the wicking time, the values are given with a standard error (using the ±symbol), and one drop (each about 42 milligrams) is dropped onto the freshly cut foam surface. Mitsutoyo Model CFC-P24 pipet was used, with deionized water. When the wicking time was too fast to be recorded within 1 second, then the time was recorded as "<1" in Table 6.

Two foam substrates were compared: one viscoelastic control foam and one high air flow viscoelastic foam (also referred to as HAFHWW herein) according to Examples. The samples are made from Varimax machine using the formulation in Table 2, each with a total flow rate of about 110 lb/min. Components on the polyol side (all the polyols except stannous octoate) are fed earlier in the about 2 feet long pin mixer mixing at about 1200 rpm. The isocyanate component is added last in the pin mixer, and the stannous octoate is added just before the isocyanate component. Reaction mixture is fed into a trough about 3 feet wide by 1 foot long by 1 foot deep, and then allowed to flow onto a conveyor belt that is lined with polyethylene sheet.

TABLE 6

| | Ex. 19 | Ex. 20 | Ex. E |
|---|---|---|---|
| Isocyanate-Reactive Component (amount based on parts by weight) | | | |
| AD 1 | 2.00 | 2.00 | — |
| DI | 0.44 | 0.44 | 2.20 |
| Polyol 1 | 20.00 | 20.00 | 25.00 |
| Polyol 2 | 60.00 | 60.00 | 50.00 |
| Polyol 3 | 20.00 | 20.00 | 25.00 |
| Surfactant | 0.80 | 0.80 | 0.80 |
| Amine 1 | 0.15 | 0.15 | 0.15 |
| Amine 2 | 0.05 | 0.05 | 0.05 |
| Tin | 0.05 | 0.05 | 0.08 |
| Isocyanate Component (amount based on parts by weight) | | | |
| Isocyanate 2 | 51.64 | 51.64 | 46.58 |
| Composition Properties | | | |
| Approximate Total Parts | 155.1 | 155.1 | 149.9 |
| Index | 84 | 84 | 74 |
| Wicking time of Uncoated Foam (seconds) [number of measurements] | <1 | <1 | 40 |
| Uncoated Foam Airflow (scfm) | 6.78 | 6.78 | 2.57 |
| Coated Foam | | | |
| Coating Material No. | 1 | 2 | 2 |
| Coated Foam Airflow (scfm) | 1.77 | 2.28 | 0.57 |
| Wicking time of Coated Foam (seconds) [number of measurements] | n/a | <1 | 8 |

Figure 2:
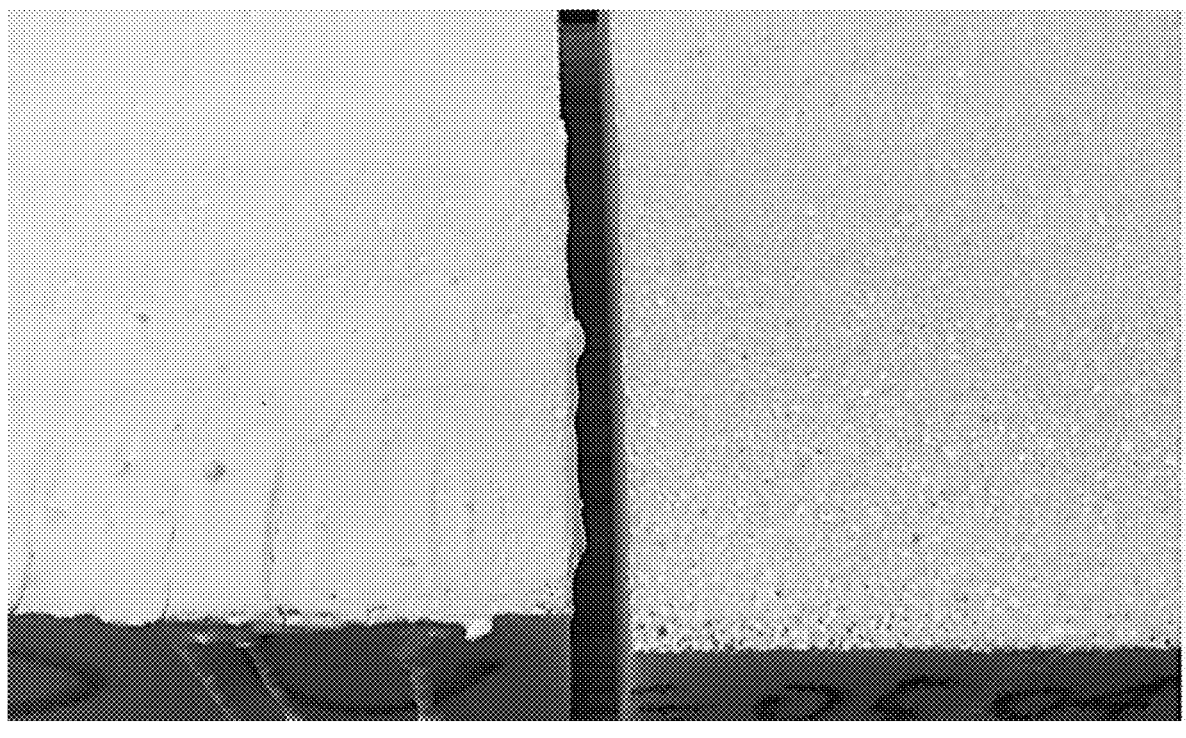
FIG. 2 illustrates the coated samples of Working Example and Comparative Example E.

Due to better water wicking properties of Examples 19 and 20, the coating solution is more easily wicked into those two foams, thus taking less total time for all the solution to flatten out into a uniform coating layer compared with viscoelastic control foam. FIG. 2 shows the comparison between the coating surfaces for both foams. The Visco control coated foam from Comparative Example E (left) demonstrate a solid, thick layer of acrylic coating. Upon compressing the foams, the coating layer cracks. While on the HAFHWW coated foam surface (right), porous foam structures are still visible. Additional compression does not deform the appearance of the coating for Example 20, and no cracking is observed by eye. For Example 20 and Comparative Example E, the wicking times were recorded. Wicking time was still very fast (<1 second) for Example 20, just as with the corresponding uncoated foam. For Comparative Example E, the wicking time was 8 seconds (total number of measurements=6).

The air flow before and after coating were measured from both samples following ASTM D3574. The data is listed below in Table 3. Note that when the polymer water emulsion #5-2 is used, the ratio of air flow for HAFHWW coated foam to Visco control coated foam is 2.28/0.57=4.0 times more air flow. Considering that the Visco control coated foam had a coating that cracked when compressed, the air flow is actually overstated compared with before cracking—that is, the uncracked Visco control coated foam would have even lower air flow values.

This "4.0 times" factor is a relative enhancement considering that the ratio of air flow for the underlying HAFHWW and Visco control substrates is 6.78/2.57=2.6 times. So the HAFHWW foam is performance advantaged over foams that don't wick water as quickly.

Second Set Coated Samples

The second set of coated samples uses a viscoelastic foam prepared with a molded foam formulation. The data and descriptive information provided herein are based on approximations. Further, the materials principally used are as the following:

Emulsion 2 A 100% acrylic polymer, having a solids content of 55.0%, a pH from 9.0 to 9.8, a density of 9.15 lb/gal, and an average particle size of 350 nm (available as RHOPLEX™ EC-2540 from The Dow Chemical Company).

Emulsion 3 A 100% acrylic polymer, having a solids content of 55.0%, a pH from 9.0 to 10.0, a density of 9.00 lb/gal, and an average particle size of 350 nm (available as RHOPLEX™ EC-1791 from The Dow Chemical Company).

Modifier A rheology modifier that is described as organic-solvent-free and a hydrophobically modified ethylene oxide urethane (available as ACRYSOL™ RM 725 from The Dow Chemical Company).

Glycol A A polyethylene glycol, having a number average molecular weight from 380 to 420 g/mol and an average hydroxyl number from 264-300 mg KOH/g (available as CARBOWAX™ Polyethylene Glycol 400 from The Dow Chemical Company).

Silica A low surface area fumed silica that has been surface modified with dimethylichlorsilane (available as CAB-O-SIL® TS-610 from Cabot).

Polyol 4 An polyoxypropylene-polyoxyethylene polyether polyol initiated with glycerine, having a nominal hydroxyl functionality of 3, an ethylene oxide content of less than 20 wt %, number average molecular weight of approximately 4900 g/mol, and an average hydroxyl number of 34 mg KOH/g (available as VORANOL™ 4701 from The Dow Chemical Company).

Polyol 5 An polyoxyethylene-polyoxypropylene polyether polyol initiated with glycerol and sucrose and EO-rich, having a nominal hydroxyl functionality of 6.9, an ethylene oxide content of greater than 50 wt %, and a hydroxyl equivalent weight of approximately 11,800 g/mol (available as VORANOL™ 4053 from The Dow Chemical Company).

Surfactant 2 A silicone surfactant (available as Niax™ L-655 from Momentive Performance Materials).

Catalyst A delayed action catalyst (available as Dabco® DCSLE from Air Products).

Exemplary coating material samples are prepared according to the formulations in Table 7, below.

TABLE 7

| | Coating Material 3 (wt %) | Coating Material 4 (wt %) |
|---|---|---|
| Weight Percentage Total Composition | | |
| PCM | 34.0 | 22.6 |
| Emulsion 2 | 14.0 | — |
| Emulsion 3 | — | 19.2 |
| Modifier | 2.0 | 1.5 |
| Glycol A | — | 15.1 |
| Silica | — | 1.0 |
| DI | 50.0 | 40.6 |

TABLE 7-continued

| | Coating Material 3 (wt %) | Coating Material 4 (wt %) |
|---|---|---|
| Total Weight of Sample Formed | | |
| Total weight (g) | 53.0 | 45.0 |
| Solids Content (%) | 42 | 50 |

The Coating Materials 3 and 4 are prepared by weighing out each component into a clean tri-pour beaker (or suitable plastic container). They were hand-mixed using a wooden tongue depressor into a mixture of even consistency was formed. The coating materials can be dispensed onto the foams by directly pouring out from the container.

Exemplary foam samples for use with the coating materials are prepared according to the formulations in Table 8, below. The foam samples are prepared using a box foam mold having dimensions of 11.3 cm vertically and 37.4 cm×37.4 cm laterally. A regular demold wax is used. Box foam mold temperature is set at 140° F. (60° C.). Foam formulations were made to be a total of 1200 grams. The components in Table 8 were mixed using a high shear mixer (4 pins in each of the four radially extending directions) at high rotation speed in a 1-gallon container. The components in the formulation with the exception of Isocyanate were mixed first for 15 seconds (2400 rpm), followed by another cycle of mixing for 15 seconds (2400 rpm). Finally the isocyanate was added to the mixture and immediately mixed for another 4 seconds (3000 rpm). Then the mixture is poured into the metal heated box foam mold, and the mold lid is closed, and allowed to foam. Foam is removed after 5 minutes of curing. Final foam weight was 975-990 grams. Three such molded foams were made.

The coated samples are prepared by pouring the indicated Coating Material bit by bit onto one surface of a foam, and cast into a uniform and smooth layer using a wooden tongue depressor, and this was continued until all the solution was poured out. Then the foam is left in the fume hood overnight at room temperature overnight to dry out the water. The total area of the foam coated is controlled at ~70 square inch so that the amount of PCM per unit area is the same. The resulting material after coating is referred to as "coated foam." Example F is the uncoated molded foam. Examples 20 and 21 are two working examples of coated foams where the PCM is incorporated into the coating formulation, which examples realize a flexible coating that passes a Coated Foam Bending Test as described below and have a Shore 00 hardness below 30.

TABLE 8

| | Ex. 20 | Ex. 21 | Ex. F |
|---|---|---|---|
| Isocyanate-Reactive Component (amount based on parts by weight) | | | |
| Polyol 1 | 25.00 | 25.00 | 25.00 |
| Polyol 2 | 42.50 | 42.50 | 42.50 |
| Polyol 4 | 15.00 | 15.00 | 15.00 |
| Polyol 5 | 17.50 | 17.50 | 17.50 |
| Surfactant 2 | 0.80 | 0.80 | 0.80 |
| Amine 1 | 0.20 | 0.20 | 0.20 |
| Amine 2 | 0.10 | 0.10 | 0.10 |
| Catalyst | 0.15 | 0.15 | 0.15 |
| DI | 2.70 | 2.70 | 2.70 |

TABLE 8-continued

| | Ex. 20 | Ex. 21 | Ex. F |
|---|---|---|---|
| Isocyanate Component (amount based on parts by weight) | | | |
| Isocyanate 1 | 47.80 | 47.80 | 47.80 |
| Composition Properties | | | |
| Approximate Total Parts | 151.8 | 151.8 | 151.8 |
| Index | 70 | 70 | 70 |
| Coated Foam | | | |
| Coating Material No. | 3 | 4 | none |
| Thermal Conductivity (BTU · in · hr$^{-1}$ ft$^{-2}$ ° F$^{-1}$) | 2.35 | 2.42 | 2.41 |
| Shore OO hardness | 24 | 9 | 3 |
| Coated Foam Bending Test | Pass | Pass | Not Applicable |

For thermal conductivity measures, foam samples are tested under ASTM C518-04 Method, using foam having a thickness of 1.0 inch thick (7×7 inches in the lateral direction). In particular, thermal conductivity is measured using Laser Comp Heat Flow Meter, on the basis of Fourier's Law, otherwise known as the Law of Heat Conduction. Measurements are made by placing the foam sample between two flat, isothermal plates, which are maintained at two different temperatures (dT). Typically, one plate is referred to as the "hot plate", and the other plate is referred to as the "cold plate". Heat flux measurements are carried at a mean test temperature of 75° F. and a 40° F. test temperature differential. The Laser Comp Heat Flow meters measure heat flow in only one direction, so Fourier's Law can be simply stated as:

$$q = -\lambda(dT/dx) \text{ or } \lambda = -q(dx/dT)$$

wherein: q=heat flux (W/m$^2$ or BTU/ft$^2$), λ=thermal conductivity (W/m-K or BTU/(hr-ft-° F.) or BTU·in·hr$^{-1}$ ft$^{-2}$ ° F.$^{-1}$), and dT/dx=temperature gradient in the x direction (K/m or ° F./ft).

For Shore 00 hardness, foam samples are conditioned in lab ambient conditions for 18 hours. Measurements are done pursuant to ASTM D2240-15, with a mean over 5 measurements being recorded as the Shore 00 hardness value. The same sample specimens as used for the thermal conductivity measurements (1.0 inch thick, 7×7 inches in the lateral direction) were used.

For coated foam bending testing, foam samples (having dimensions of 7×7×1.0 inches) are folded in half, with the coated face pointing outwards. Then, the bent foam samples are placed inside a vise that is 2.0 inch wide (the bent side is pointing up). Next, the coating on the samples is visually inspected to look for any cracks wider than 2 mm. If no such cracks are found, then the sample is assigned "pass" as the resultant value.

The invention claimed is:

1. A coated viscoelastic polyurethane foam, comprising:
a viscoelastic polyurethane foam that is a product of a reaction system having an isocyanate component that includes at least one isocyanate and an isocyanate-reactive component that includes a polyol component, and the isocyanate index of the reaction system being from 50 to 150, wherein the polyol component includes a blend of at least three polyols, the blend including:

(i) a polyoxyethylene-polyoxypropylene polyether polyol that has an ethylene oxide content of at least 50 wt %, has a nominal hydroxyl functionality from 2 to 4, has a number average molecular weight from 700 g/mol to 1500 g/mol, and accounts for 25 wt % to 90 wt % of the isocyanate-reactive component, (ii) a polyoxypropylene-polyoxyethylene polyether polyol that has an ethylene oxide content of less than 20 wt %, has a nominal hydroxyl functionality from 2 to 4, has a number average molecular weight greater than 1500 g/mol and less than 6000 g/mol, and accounts for 5 wt % to 50 wt % of the isocyanate-reactive component, and (iii) a polyoxypropylene polyether polyol that has a nominal hydroxyl functionality from 2 to 4, has a number average molecular weight from 700 g/mol to 1500 g/mol, and accounts for 5 wt % to 50 wt % of the isocyanate-reactive component;

a coating material on and embedded within the viscoelastic polyurethane foam, the coating material including one or more aqueous polymer emulsions and one or more preformed encapsulated phase change materials; and wherein the one or more aqueous polymer emulsions comprises, as copolymerized units, from 0.3% to 2.5% by weight, based on dry polymer weight, (meth)acrylic acid.

2. The coated viscoelastic polyurethane foam as claimed in claim 1, wherein the polyol component includes a blend of at least four polyols, the blend including:

(i) the polyoxyethylene-polyoxypropylene polyether polyol that accounts for 35 wt % to 70 wt % of the isocyanate-reactive component, (ii) the polyoxypropylene-polyoxyethylene polyether polyol that accounts for 10 wt % to 30 wt % of the isocyanate-reactive component, (iii) the polyoxypropylene polyether polyol that accounts for 10 wt % to 30 wt % of the isocyanate-reactive component, and (iv) another polyoxyethylene-polyoxypropylene polyether polyol that has an ethylene oxide content of at least 50 wt %, has a nominal hydroxyl functionality from 4 to 8, has a number average molecular weight from 8,500 g/mol to 14,500 g/mol, and accounts for 10 wt % to 20 wt % of the isocyanate reactive component.

3. The coated viscoelastic polyurethane foam as claimed in claim 1, wherein the coating material includes from 5 wt % to 95 wt % of the one or more preformed encapsulated phase change materials and from 5 wt % to 95 wt % of the one or more aqueous polymer emulsions.

4. The coated viscoelastic polyurethane foam as claimed in claim 3, wherein the coating material includes from 20 wt % to 40 wt % of the one or more preformed encapsulated phase change materials.

5. The coated viscoelastic polyurethane foam as claimed in claim 1, wherein the coating material further includes at least one selected from the group of a silicone surfactant and a silica.

6. The coated viscoelastic polyurethane foam as claimed in claim 1, wherein the coating material includes water in an amount of from 10 wt % to 70 wt %.

7. The coated viscoelastic polyurethane foam as claimed in claim 1, wherein the coated viscoelastic polyurethane foam has a Shore OO hardness from 5 to 30, according to ASTM D2240-15.

8. The coated viscoelastic polyurethane foam as claimed in claim 1, wherein the coating material is embedded within voids in the viscoelastic polyurethane foam.

* * * * *